(12) United States Patent
Tanaka et al.

(10) Patent No.: US 10,810,296 B2
(45) Date of Patent: Oct. 20, 2020

(54) COMMUNICATION APPARATUS, COMMUNICATION METHOD, AND COMMUNICATION SYSTEM

(71) Applicants: Sony Corporation, Tokyo (JP); Sony Mobile Communications Inc., Tokyo (JP)

(72) Inventors: Katsuyuki Tanaka, Kanagawa (JP); Shigeki Teramoto, Kanagawa (JP); Yoshihito Ishibashi, Tokyo (JP)

(73) Assignees: Sony Corporation, Tokyo (JP); Sony Mobile Communications Inc., Tokyo (JP)

( * ) Notice: Subject to any disclaimer, the term of this patent is extended or adjusted under 35 U.S.C. 154(b) by 236 days.

(21) Appl. No.: 15/753,787

(22) PCT Filed: Aug. 12, 2016

(86) PCT No.: PCT/JP2016/073716
§ 371 (c)(1),
(2) Date: Feb. 20, 2018

(87) PCT Pub. No.: WO2017/033766
PCT Pub. Date: Mar. 2, 2017

(65) Prior Publication Data
US 2018/0248872 A1    Aug. 30, 2018

(30) Foreign Application Priority Data
Aug. 25, 2015   (JP) .................................. 2015-166020

(51) Int. Cl.
*H04L 29/06* (2006.01)
*G06F 21/35* (2013.01)
(Continued)

(52) U.S. Cl.
CPC ......... *G06F 21/35* (2013.01); *G06K 7/10009* (2013.01); *G06K 19/077* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 8,572,392 B2 * | 10/2013 | Ishidera | G06F 21/34 380/279 |
| 8,838,989 B2 * | 9/2014 | Adams | H04L 63/0861 713/186 |

(Continued)

FOREIGN PATENT DOCUMENTS

| | | | |
|---|---|---|---|
| JP | 2003-317042 A | 11/2003 | |
| JP | 2006-195559 A | 7/2006 | |

(Continued)

*Primary Examiner* — Piotr Poltorak
(74) *Attorney, Agent, or Firm* — Michael Best & Friedrich LLP

(57) ABSTRACT

A communication apparatus of the disclosure includes: an authentication section that performs personal authentication of a user through BAN (Body Area Network) communication prior to data exchange with a communication peer for predetermined processing; and a communication section that performs the data exchange with the communication peer for the predetermined processing in a case of success of the personal authentication.

13 Claims, 18 Drawing Sheets

(51) Int. Cl.
*G09C 1/00* (2006.01)
*G06K 19/077* (2006.01)
*G06K 19/12* (2006.01)
*G06K 7/10* (2006.01)
*G06Q 20/40* (2012.01)
*H04L 9/32* (2006.01)
*H04W 12/06* (2009.01)
*H04W 4/80* (2018.01)
*G06Q 20/32* (2012.01)

(52) U.S. Cl.
CPC ......... *G06K 19/12* (2013.01); *G06Q 20/3278* (2013.01); *G06Q 20/401* (2013.01); *G06Q 20/40145* (2013.01); *G09C 1/00* (2013.01); *H04L 9/3226* (2013.01); *H04L 63/0492* (2013.01); *H04L 63/083* (2013.01); *H04L 63/0861* (2013.01); *H04L 63/0876* (2013.01); *H04W 4/80* (2018.02); *H04W 12/0605* (2019.01); *H04W 12/0608* (2019.01); *H04L 2209/805* (2013.01)

(56) References Cited

U.S. PATENT DOCUMENTS

| | | | | |
|---|---|---|---|---|
| 2004/0044482 | A1* | 3/2004 | Takeda | G06F 21/32 702/19 |
| 2005/0243061 | A1* | 11/2005 | Liberty | A61B 5/1171 345/158 |
| 2006/0242285 | A1* | 10/2006 | Moriwaki | H04L 67/12 709/223 |
| 2006/0258408 | A1* | 11/2006 | Tuomela | H04B 13/005 455/569.1 |
| 2007/0033415 | A1* | 2/2007 | Yumoto | E05B 15/102 713/186 |
| 2007/0150419 | A1* | 6/2007 | Kozlay | G06Q 20/40145 705/67 |
| 2008/0044014 | A1* | 2/2008 | Corndorf | H04L 9/3242 380/37 |
| 2009/0064296 | A1* | 3/2009 | Aikawa | G06F 21/32 726/6 |
| 2009/0249478 | A1* | 10/2009 | Rosener | G06F 21/31 726/19 |
| 2009/0267735 | A1* | 10/2009 | Kim | G06F 21/32 340/5.83 |
| 2010/0138666 | A1* | 6/2010 | Adams | G06F 21/32 713/186 |
| 2010/0161488 | A1* | 6/2010 | Evans | G06Q 20/20 705/44 |
| 2010/0263031 | A1* | 10/2010 | Tsuchiya | G06F 21/32 726/7 |
| 2010/0299716 | A1* | 11/2010 | Rouskov | H04L 9/3234 726/1 |
| 2011/0099384 | A1* | 4/2011 | Grange | H04L 9/0897 713/184 |
| 2011/0270480 | A1* | 11/2011 | Ishibashi | B60L 11/1824 701/22 |
| 2012/0039474 | A1* | 2/2012 | Ho | H04L 9/0844 380/278 |
| 2012/0322461 | A1* | 12/2012 | Ito | G06F 21/35 455/456.1 |
| 2014/0085050 | A1* | 3/2014 | Luna | G07C 9/00158 340/5.82 |
| 2014/0372551 | A1* | 12/2014 | Fleck | H04W 72/04 709/213 |
| 2015/0070132 | A1* | 3/2015 | Candelore | G07C 9/00182 340/5.61 |
| 2015/0163221 | A1* | 6/2015 | Bolin | H04W 76/14 726/7 |
| 2015/0373019 | A1* | 12/2015 | El Saddik | G06F 21/32 340/5.52 |
| 2016/0086176 | A1* | 3/2016 | Silva Pinto | G06Q 20/401 705/44 |
| 2016/0142816 | A1* | 5/2016 | Weast | H04R 1/46 381/151 |
| 2016/0197925 | A1* | 7/2016 | Fukushi | G06F 21/34 726/6 |
| 2017/0068956 | A1* | 3/2017 | Jones | G06Q 20/401 |
| 2017/0171755 | A1* | 6/2017 | Grange | H04L 63/06 |

FOREIGN PATENT DOCUMENTS

| | | |
|---|---|---|
| JP | 2006-268871 A | 10/2006 |
| JP | 2010-178071 A | 8/2010 |
| JP | 2013-016957 A | 1/2013 |

* cited by examiner

[FIG. 1]
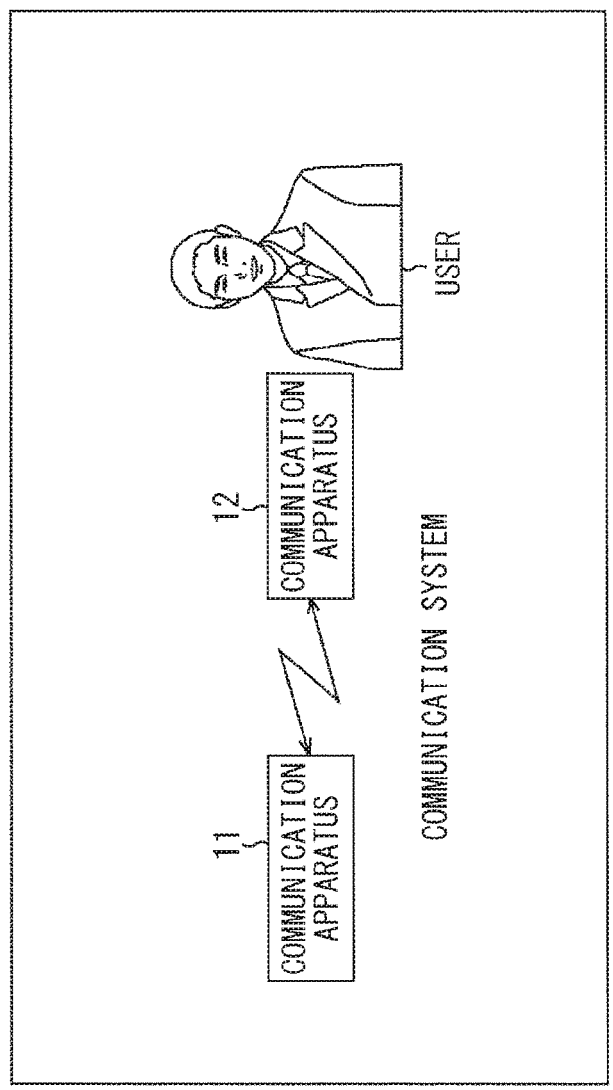

[ FIG. 2 ]
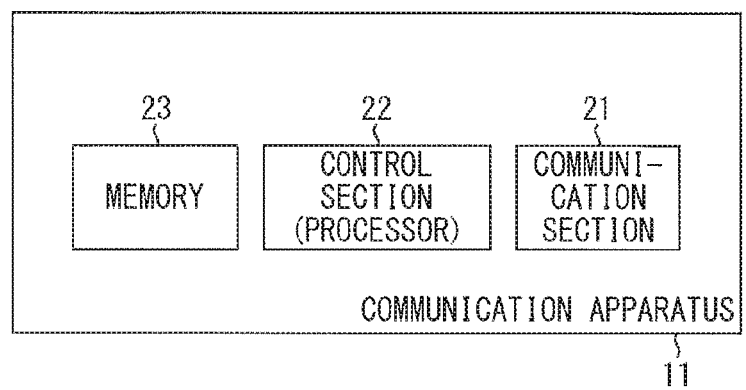

[FIG. 3]
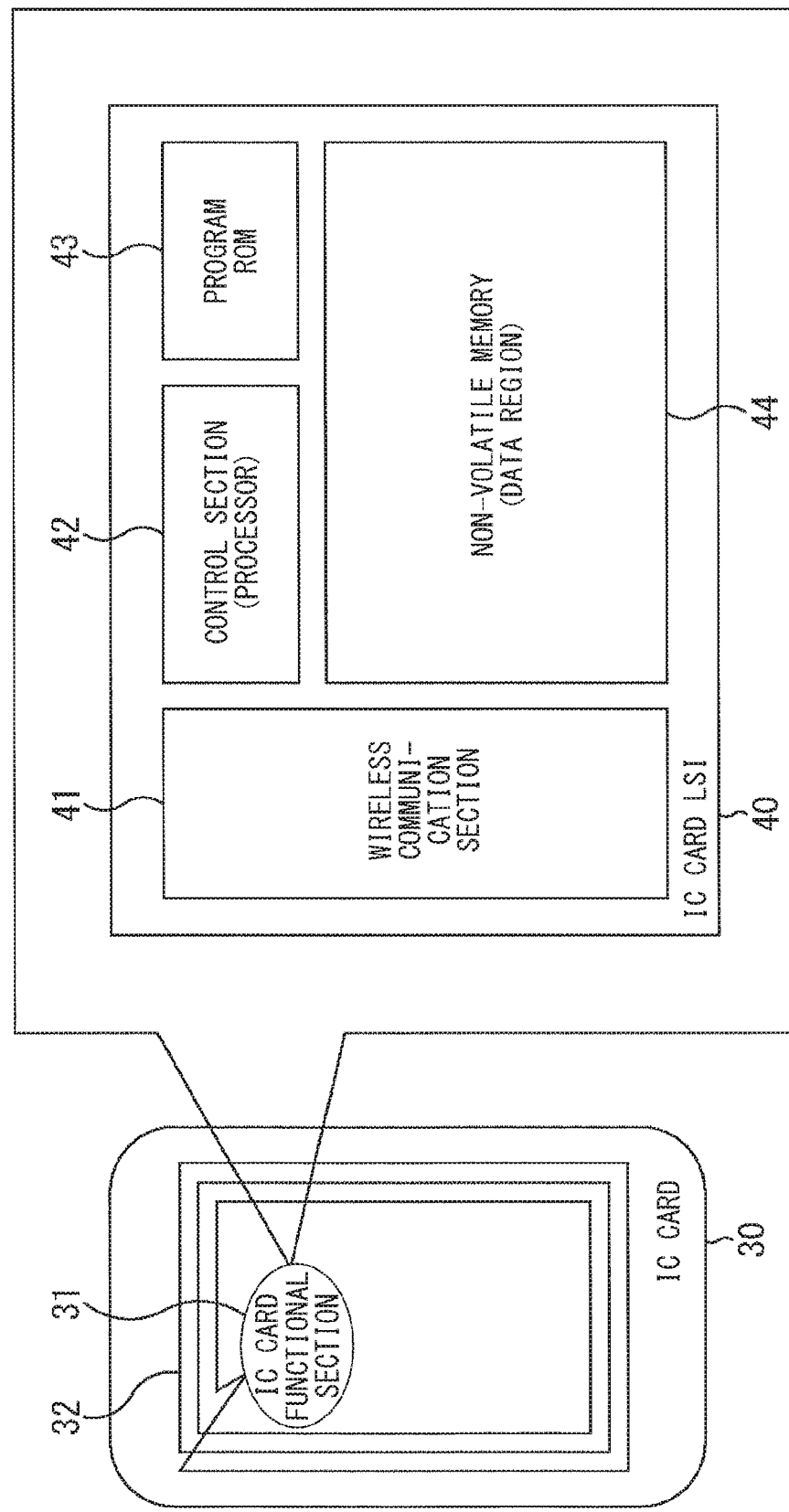

[ FIG. 4 ]
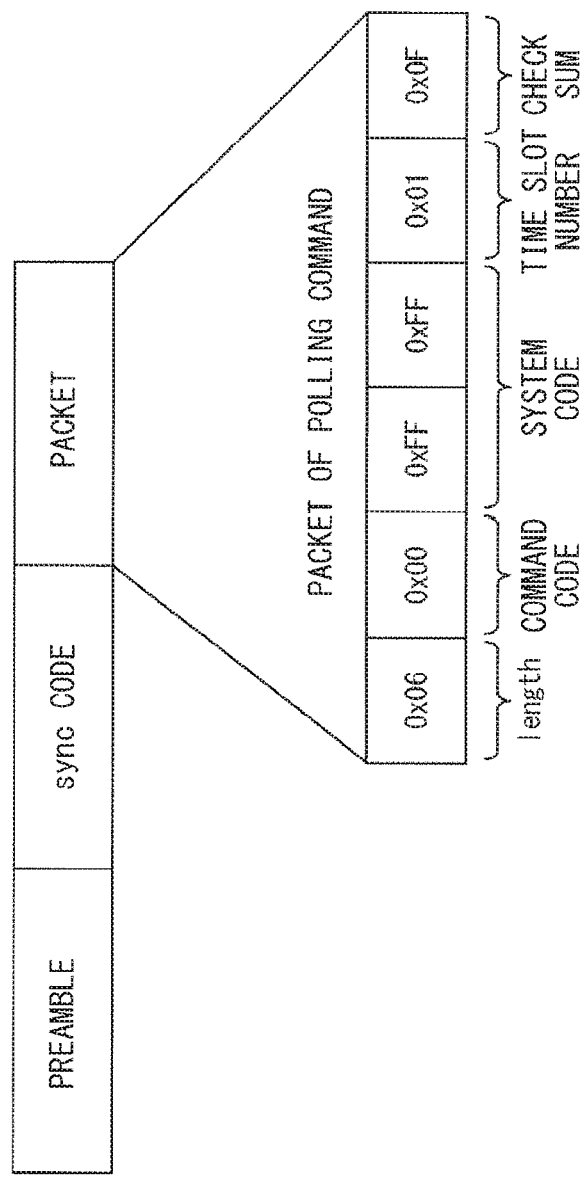

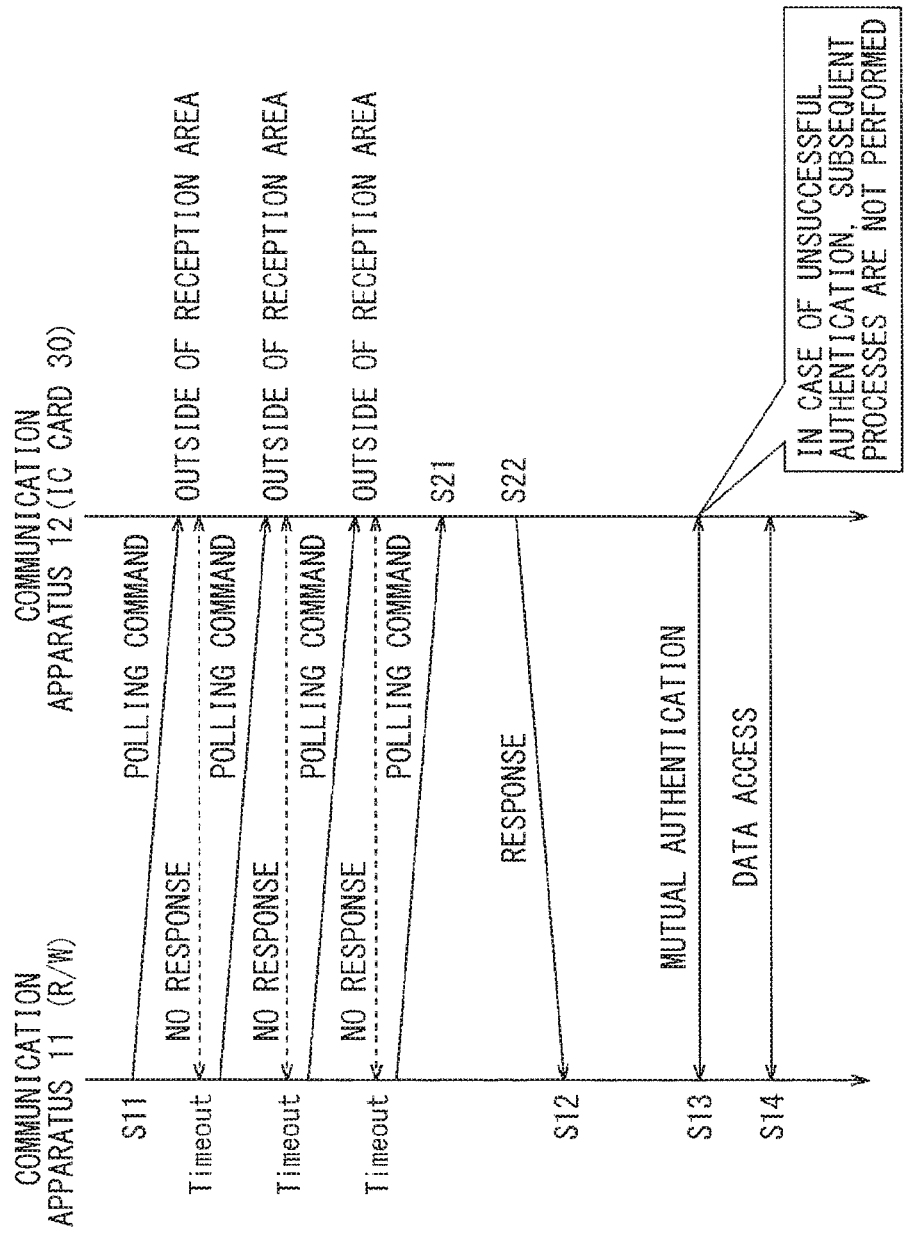
[FIG. 5]

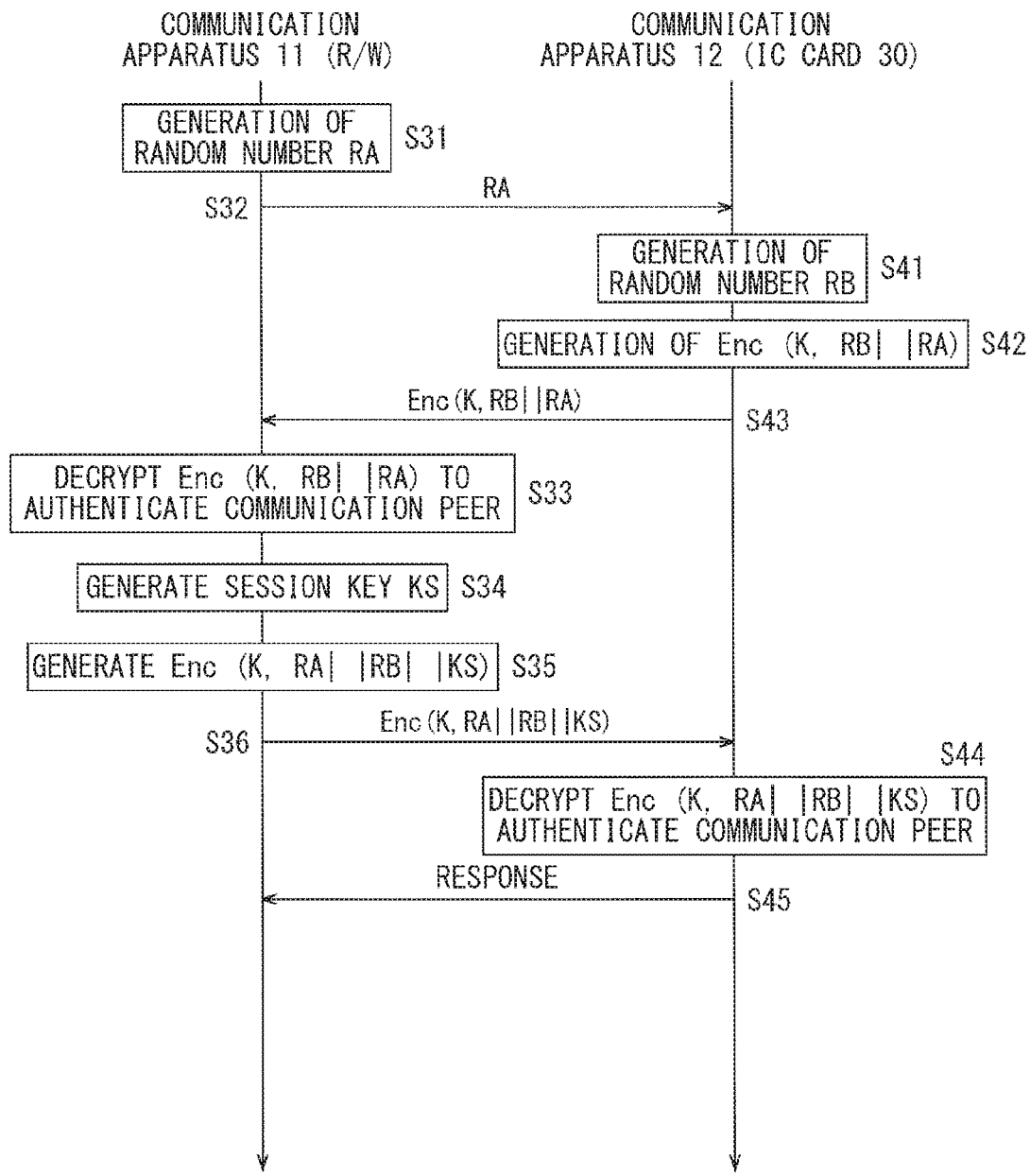

[ FIG. 7 ]
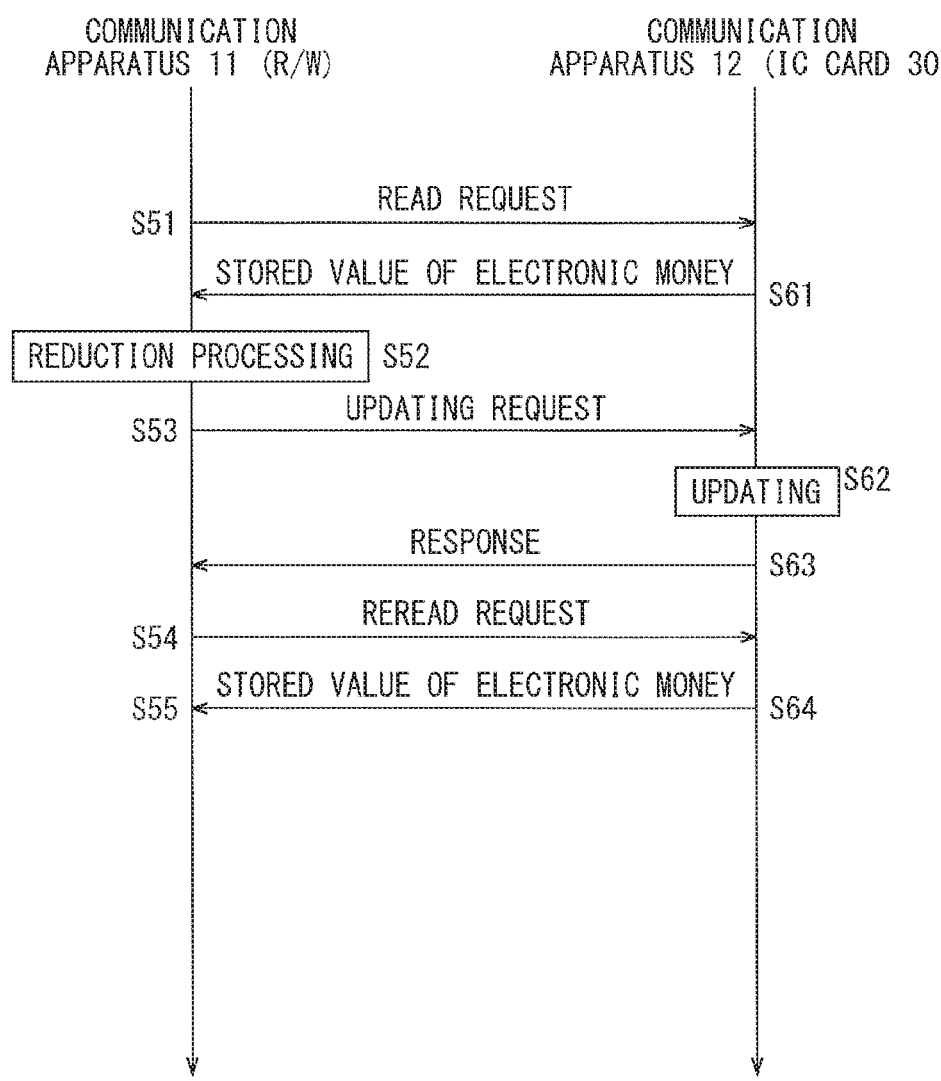

[FIG. 8]
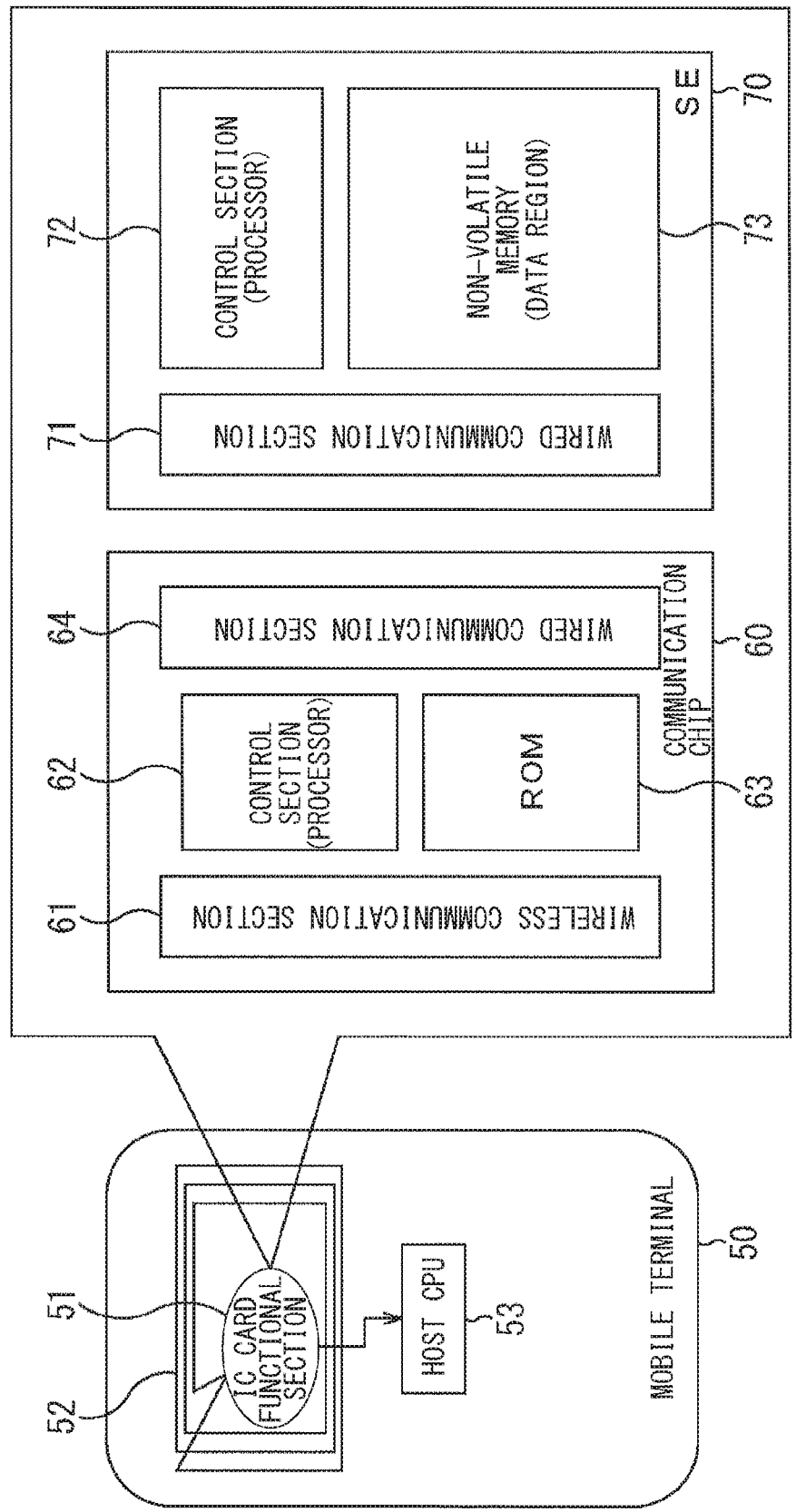

[FIG. 9]
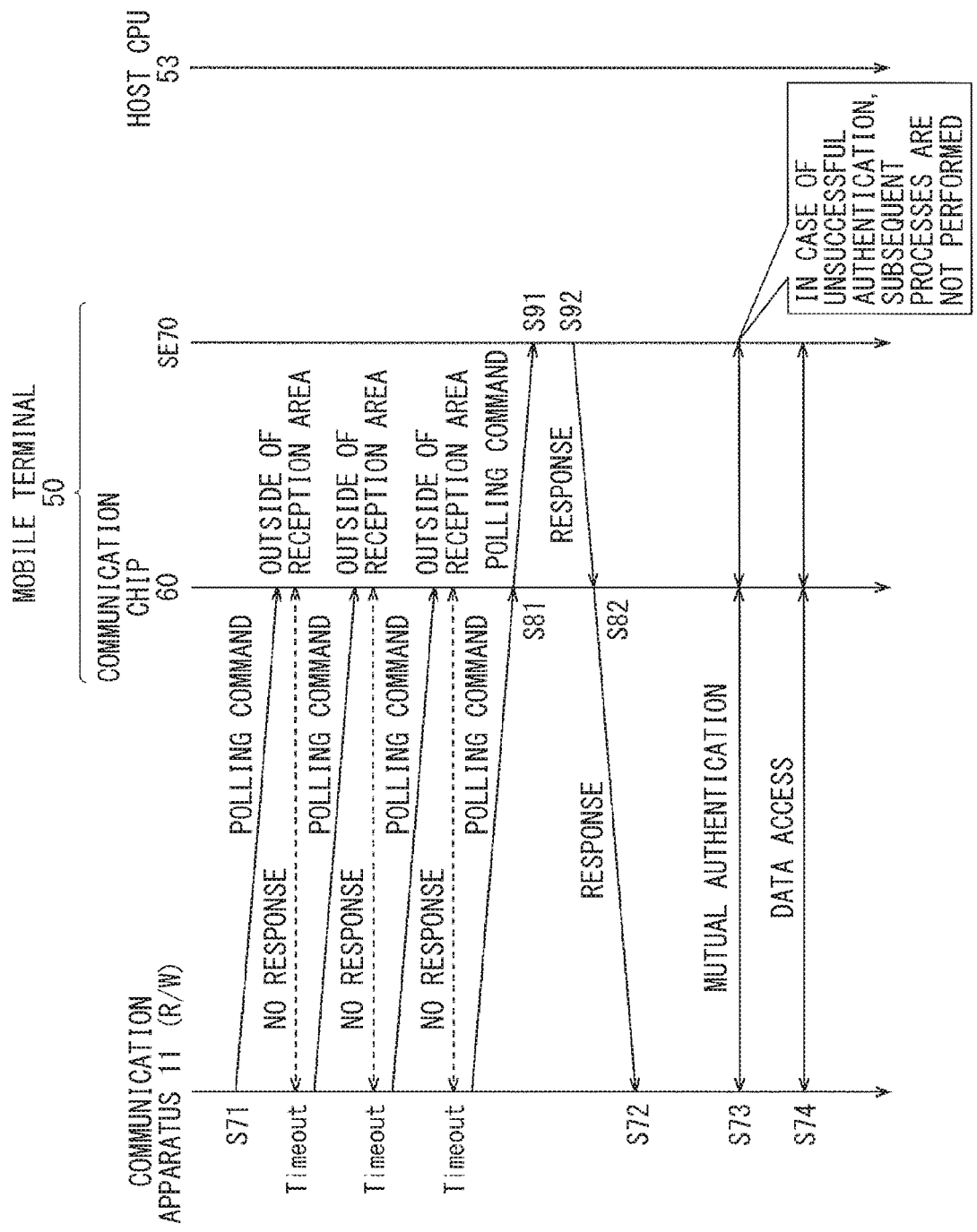

[ FIG. 10 ]
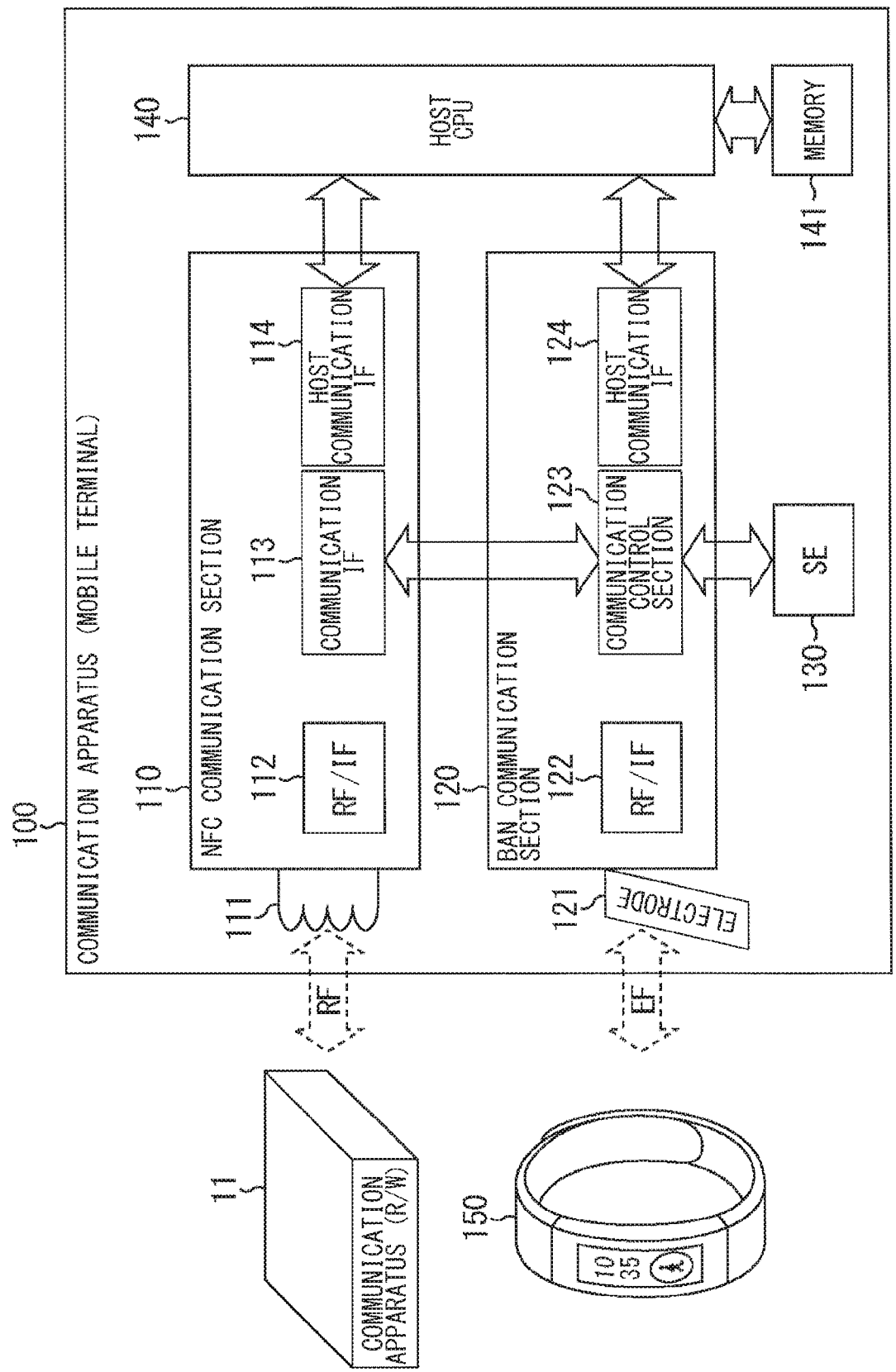

[ FIG. 11 ]
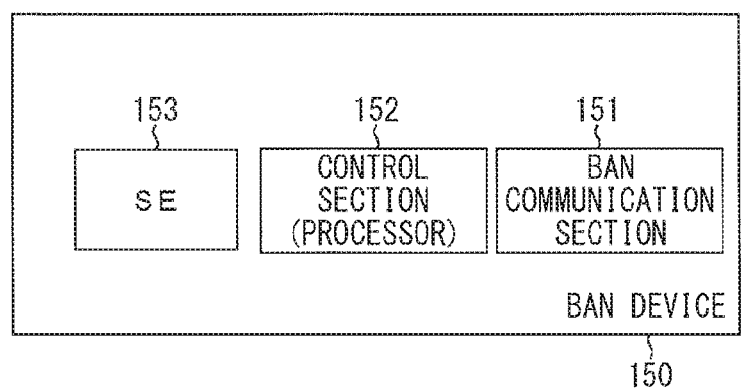

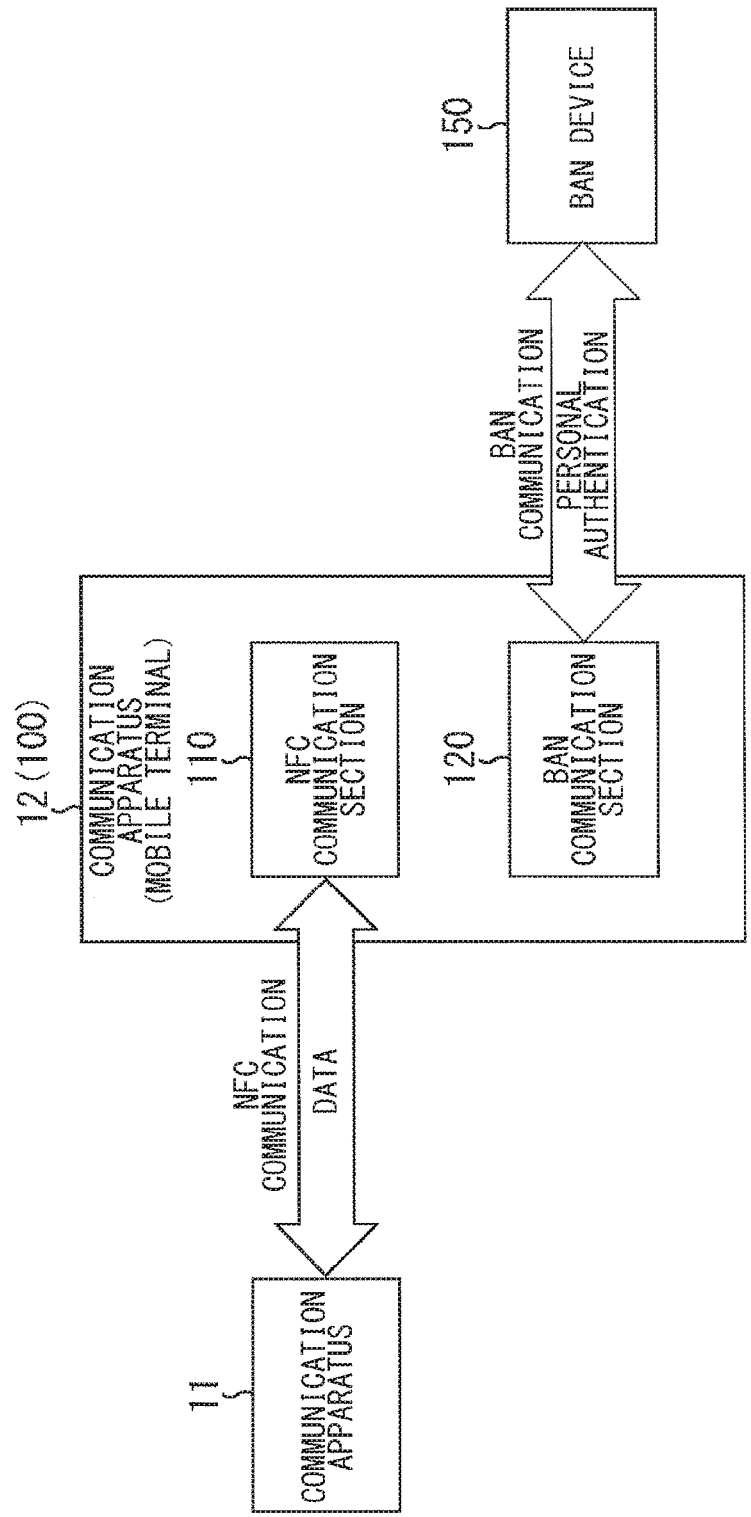
[FIG. 12]

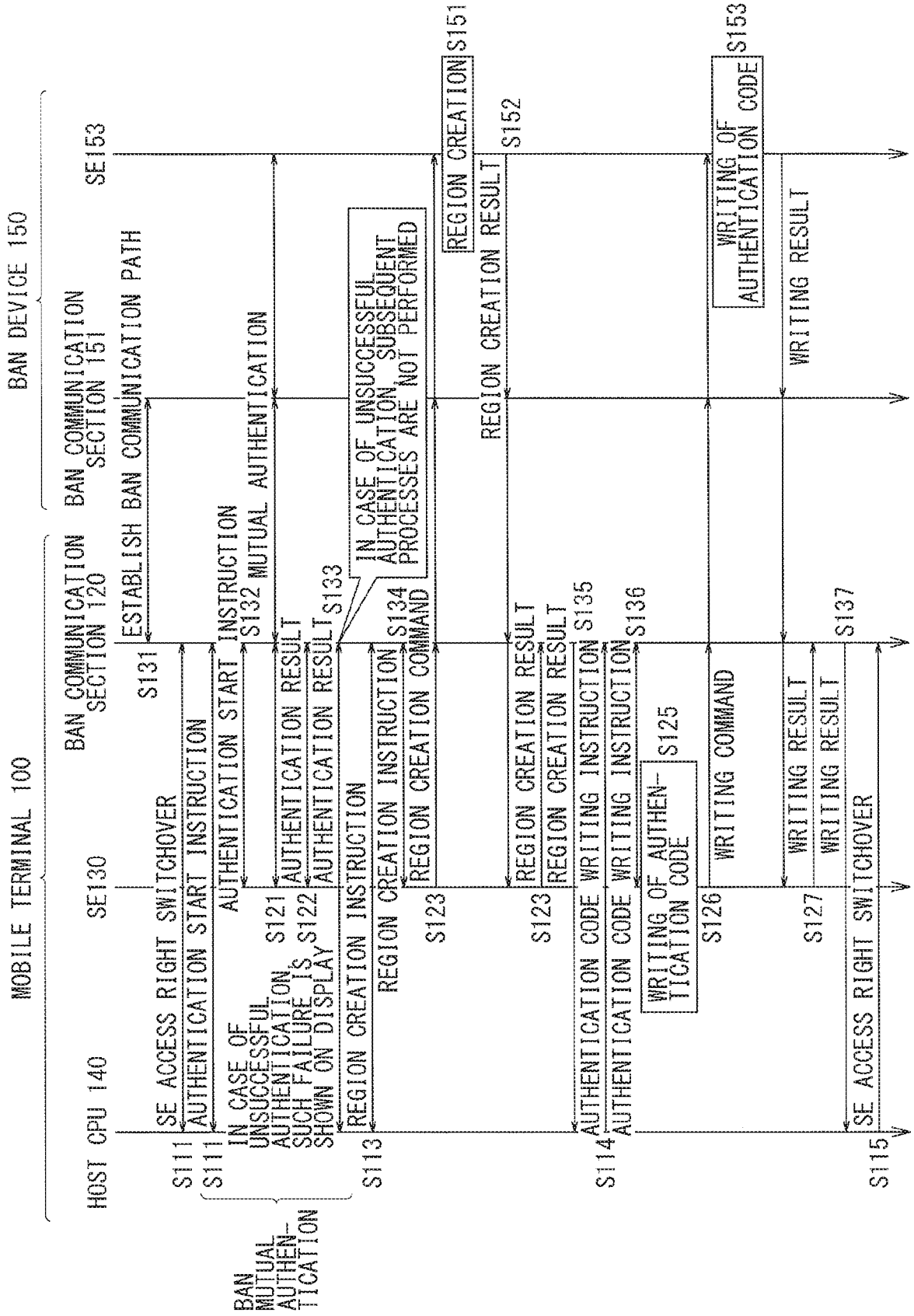
[FIG. 13]

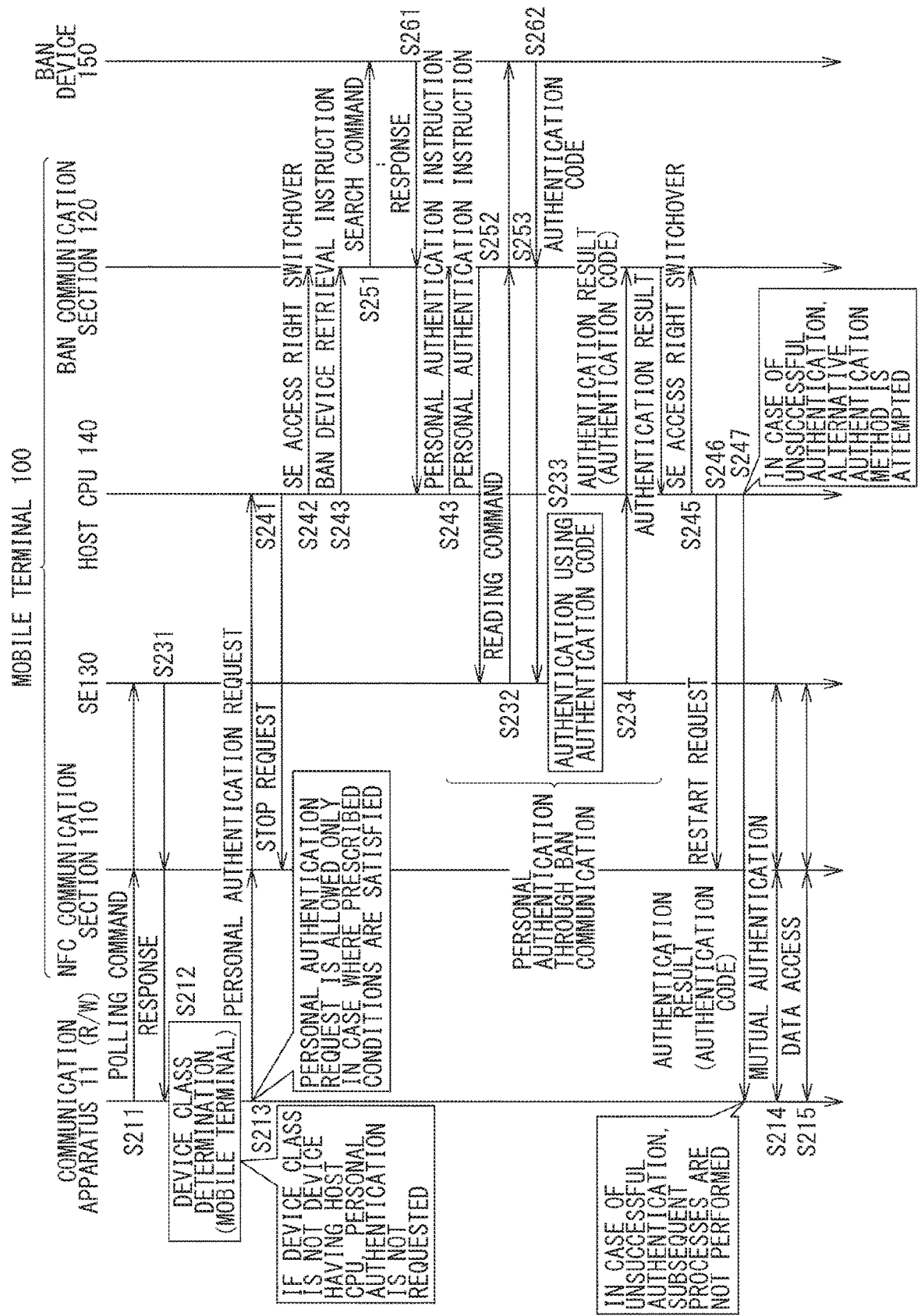
[FIG. 14]

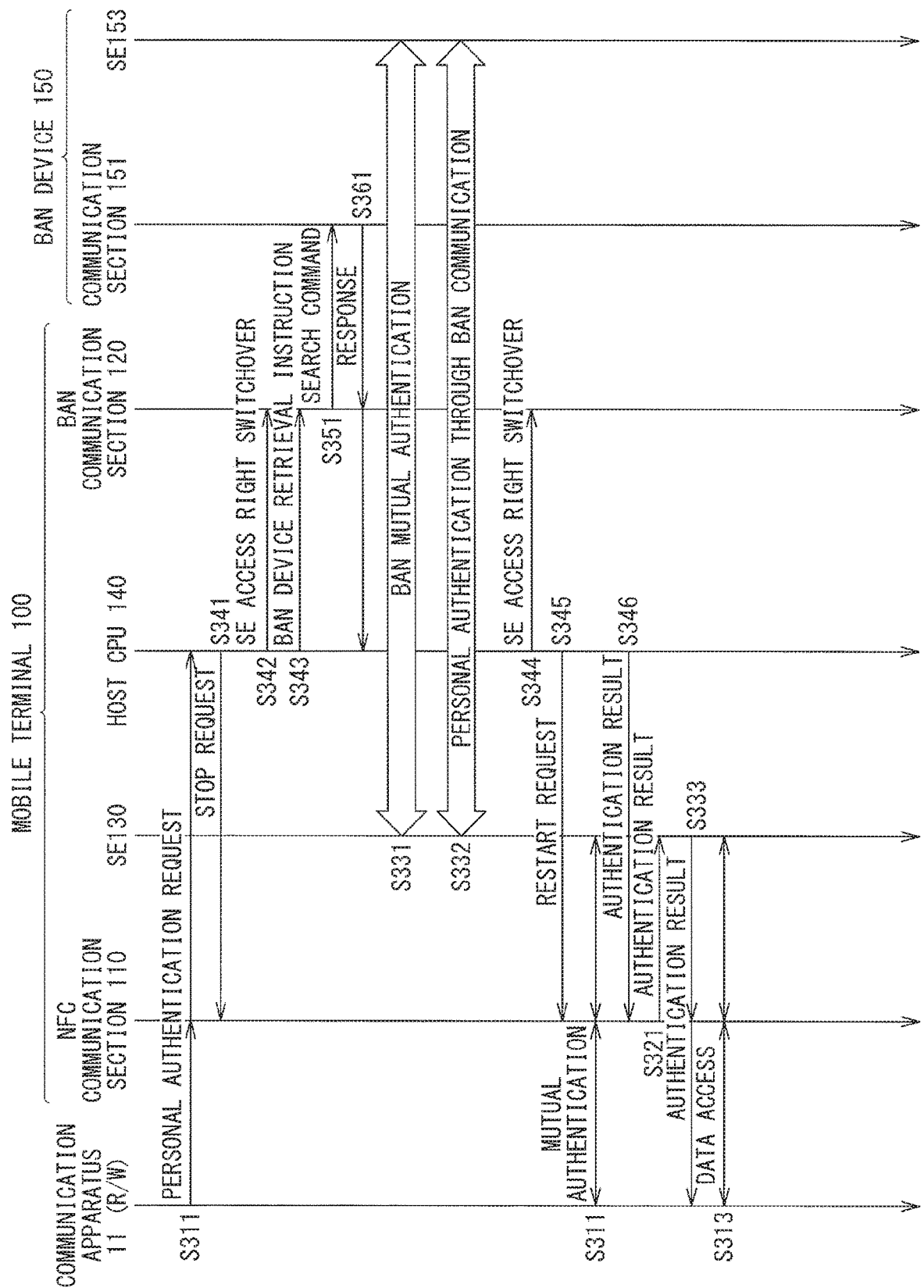
[ FIG. 15 ]

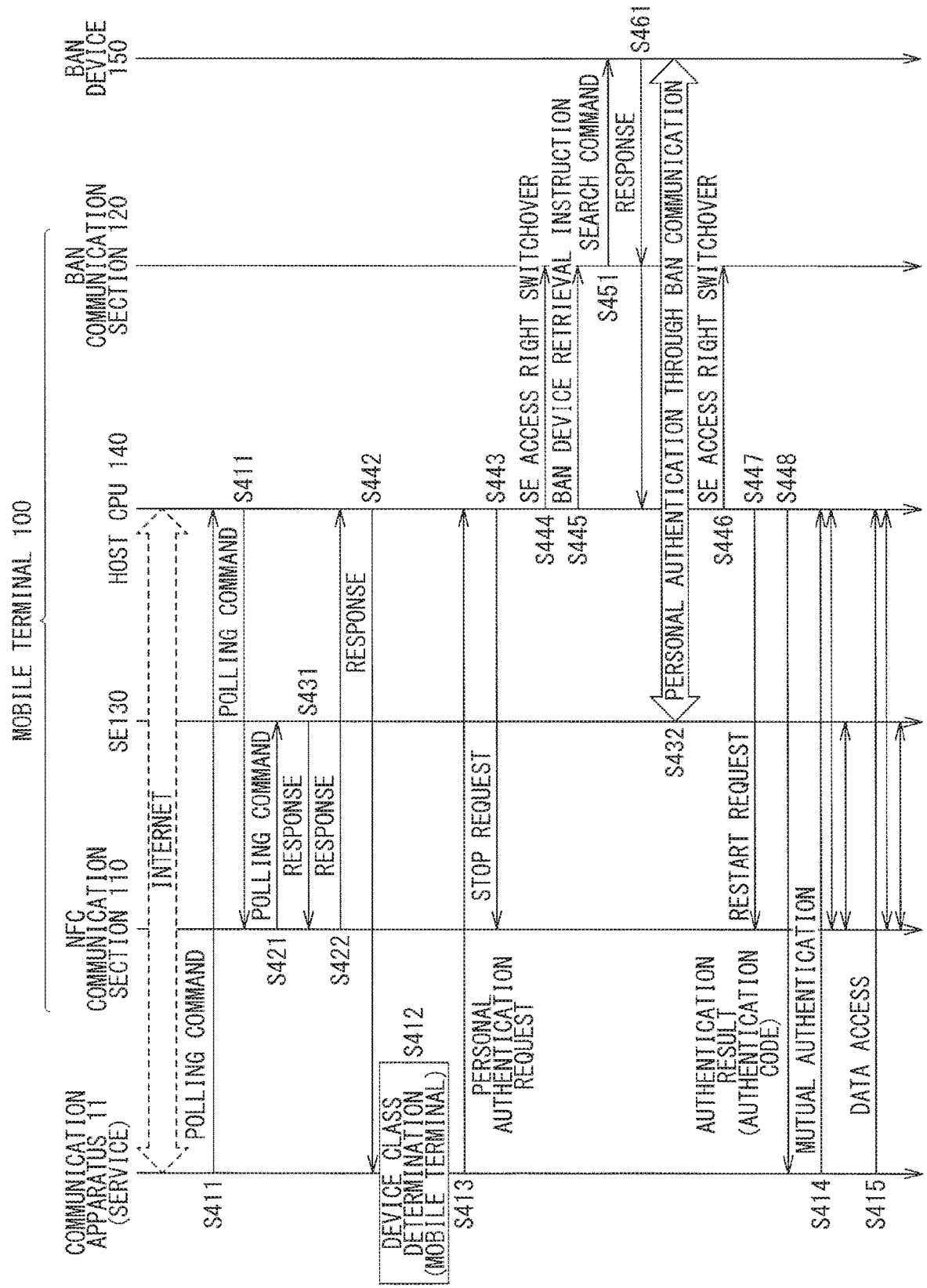
[FIG. 16]

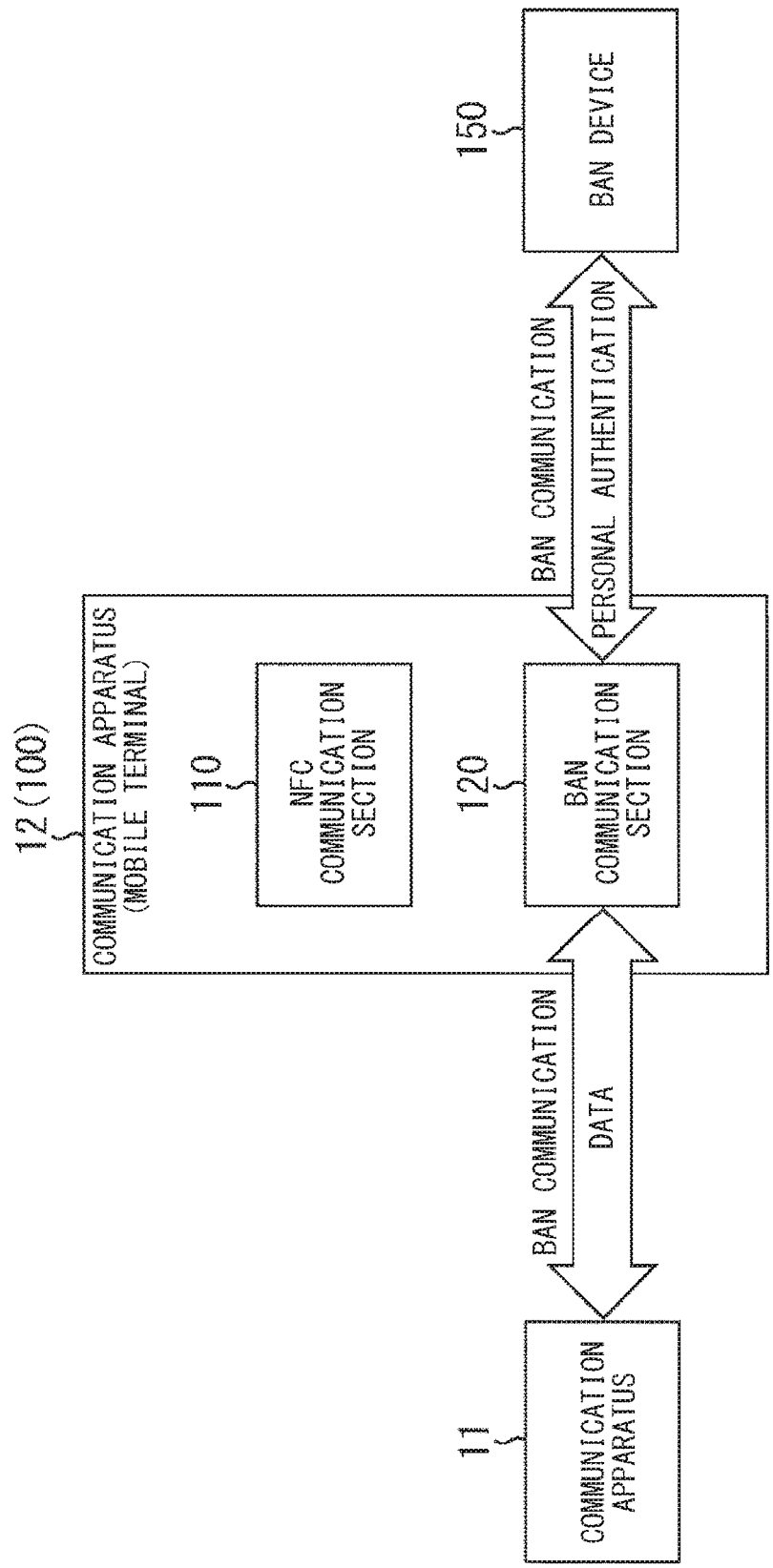
[ FIG. 17 ]

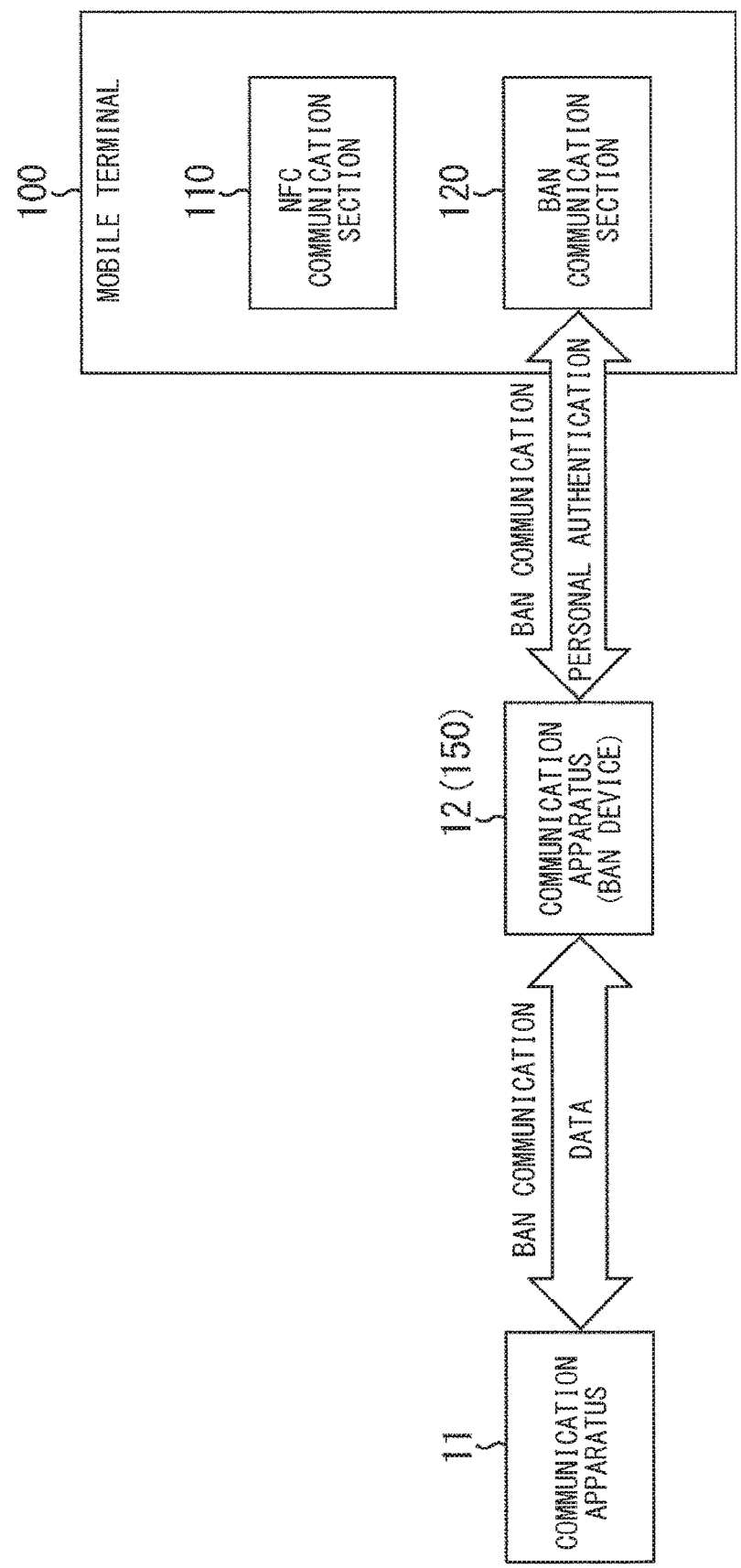
[ FIG. 18 ]

COMMUNICATION APPARATUS, COMMUNICATION METHOD, AND COMMUNICATION SYSTEM

TECHNICAL FIELD

The technology relates to a communication apparatus, a communication method, and a communication system, and particularly to a communication apparatus, a communication method, and a communication system that allow for prevention of illegal use by a third person, for example.

BACKGROUND ART

In recent years, for example, IC card functional capabilities have become widespread that make various settlements using electronic value, into which anything having a monetary value such as money, a commuter pass, a ticket, and points is converted by electronization, in such a manner that the electronic value is stored securely and data exchange is carried out through short-distance wireless communication.

Here, the IC card functional capabilities mean all aspects of electronic communication processing to be carried out between communication apparatuses incorporating one or both of a function of a R/W that reads/writes data recorded in an IC card or a mobile terminal, etc. to perform predetermined processing; and a function of writing data into a non-volatile memory held internally and reading data for response to the R/W in accordance with an instruction from the R/W.

Initially, the IC card functional capabilities have been built in an IC card; however, mobile terminals such as a mobile phone and a smartphone each with the built-in IC card functional capabilities have recently become widespread. Further, wearable devices represented by a wristwatch, a band, and glasses have become widespread.

Examples of the short-distance wireless communication in which data exchange is performed in the IC card functional capabilities includes NFC (Near Field Communication) communication. The NFC communication is standardized as ISO/IEC 14443 and ISO/IEC 18092, for example. Examples of the NFC communication method include methods called type A, type B, and type C, etc.

Here, a communication apparatus such as the IC card and the mobile terminal each with the built-in IC card functional capabilities is also referred to as a target apparatus. A communication apparatus such as the R/W (Reader/Writer) that performs polling to the target apparatus is also referred to as an initiator apparatus.

In the NFC communication, for example, mutual authentication is carried out between the initiator apparatus and the target apparatus. Only in a case of successful mutual authentication, it is possible to perform data exchange for predetermined processing such as settlement (for example, see PTL 1).

In such a case, it is possible to prevent an attempt of unauthorized processing in which a valid initiator apparatus or target apparatus carries out the data exchange for the predetermined processing with an invalid initiator apparatus or target apparatus.

CITATION LIST

Patent Literature

PTL 1: Japanese Unexamined Patent Application Publication No. 2003-317042

SUMMARY OF THE INVENTION

As described above, in the NFC communication, the mutual authentication makes it possible to prevent the data exchange for the predetermined processing from being performed with the invalid initiator apparatus or target apparatus.

However, for example, in a case where a mobile terminal, etc. serving as the target apparatus has fallen in hands of a third person due to theft etc., it has been difficult to prevent illegal use by the third person, such as making settlement using the electronic value by the third person with use of a mobile terminal of another person.

It is desirable to allow for prevention of illegal use by a third person.

A communication apparatus according to an embodiment of the disclosure includes: an authentication section that performs personal authentication of a user through BAN (Body Area Network) communication prior to data exchange with a communication peer for predetermined processing; and a communication section that performs the data exchange with the communication peer for the predetermined processing in a case of success of the personal authentication.

A communication method according to an embodiment of the disclosure includes: performing personal authentication of a user through BAN (Body Area Network) communication prior to data exchange with a communication peer for predetermined processing; and performing data exchange with the communication peer for the predetermined processing in a case of success of the personal authentication.

In the communication apparatus and the communication method according to the respective embodiments of the disclosure, the personal authentication of the user is performed through the BAN (Body Area Network) communication prior to the data exchange with the communication peer for the predetermined processing and the data exchange with the communication peer for the predetermined processing is performed in a case of success of the personal authentication.

Another communication apparatus according to an embodiment of the disclosure includes: a communication section that transmits a request of personal authentication of a user prior to data exchange with a communication peer for predetermined processing, and performs data exchange with the communication peer for the predetermined processing in a case of success of the personal authentication through BAN (Body Area Network) communication in the communication peer.

Another communication method according to an embodiment of the disclosure includes: transmitting a request of personal authentication of a user prior to data exchange with a communication peer for predetermined processing; and performing the data exchange with the communication peer for the predetermined processing in a case of success of the personal authentication through BAN (Body Area Network) communication in the communication peer.

In the other communication apparatus and the other communication method according to the respective embodiments of the disclosure, the request of the personal authentication of the user is transmitted prior to the data exchange with the communication peer for the predetermined processing, and the data exchange with the communication peer for the predetermined processing is performed in a case of success of the personal authentication through the BAN (Body Area Network) communication.

A communication system according to an embodiment of the disclosure includes: a first communication apparatus; and a second communication apparatus. The first communication apparatus includes: a first communication section that transmits a request of personal authentication of a user prior to data exchange with the second communication apparatus for predetermined processing, and performs the data exchange with the second communication apparatus for the predetermined processing in a case of success of the personal authentication through BAN (Body Area Network) communication in the second communication apparatus. The second communication apparatus includes: an authentication section that performs the personal authentication of the user through the BAN communication in response to the request from the first communication apparatus prior to data exchange with the first communication apparatus for predetermined processing; and a second communication section that performs the data exchange with the first communication apparatus for the predetermined processing in a case of success of the personal authentication.

In the communication system according to the embodiment of the disclosure, in the first communication apparatus, the request of personal authentication of the user is transmitted prior to the data exchange with the second communication apparatus for the predetermined processing, and the data exchange with the second communication apparatus for the predetermined processing is performed in a case of success of the personal authentication through BAN (Body Area Network) communication in the second communication apparatus. In the second communication apparatus, the personal authentication of the user through the BAN communication is performed in response to the request from the first communication apparatus prior to the data exchange with the first communication apparatus for the predetermined processing; and the data exchange between the first communication apparatus for the predetermined processing is performed in a case of success of the personal authentication.

It is to be noted that each of the communication apparatus and the other communication apparatus according to the respective embodiments of the disclosure may be an independent apparatus, or may be an internal block that configures a single apparatus.

According to the technology, it is possible to prevent illegal use by a third person.

It is to be noted that effects are not necessarily limited to the effects described here, and may be one or more of effects described in the disclosure.

BRIEF DESCRIPTION OF DRAWINGS

FIG. 1 is a block diagram illustrating a configuration example of an embodiment of a communication system to which the technology is applied.

FIG. 2 is a block diagram illustrating a configuration example of a communication apparatus 11.

FIG. 3 is a block diagram illustrating a configuration example of an IC card as a first configuration example of a communication apparatus 12.

FIG. 4 is a diagram illustrating a format of a signal to be transmitted and received by the communication apparatuses 11 and 12 in NFC communication.

FIG. 5 is an explanatory diagram illustrating an example of operation of an R/W serving as the communication apparatus 11 and an IC card 30 serving as the communication apparatus 12.

FIG. 6 is an explanatory diagram illustrating an overview of a process of mutual authentication in a step S13 to be carried out between the communication apparatuses 11 and 12.

FIG. 7 is an explanatory diagram illustrating an example of data exchange in a step S14 to be carried out between the communication apparatuses 11 and 12.

FIG. 8 is a block diagram illustrating a configuration example of a mobile terminal as a second configuration example of the communication apparatus 12.

FIG. 9 is an explanatory diagram illustrating an example of operation of the R/W serving as the communication apparatus 11 and a mobile terminal 50 serving as the communication apparatus 12.

FIG. 10 is a block diagram illustrating a configuration example of a mobile terminal as a third configuration example of the communication apparatus 12.

FIG. 11 is a block diagram illustrating a configuration example of a BAN device 150 to be used for personal authentication.

FIG. 12 is a diagram illustrating an overview of a first example of communication performed by the communication apparatus 12.

FIG. 13 is an explanatory diagram illustrating an example of a registration process of registering the BAN device 150 in a mobile terminal 100 as a registered device.

FIG. 14 is an explanatory diagram illustrating an example of operation of the R/W serving as the communication apparatus 11 and the mobile terminal 100 serving as the communication apparatus 12.

FIG. 15 is an explanatory diagram illustrating another example of operation of the R/W serving as the communication apparatus 11 and the mobile terminal 100 serving as the communication apparatus 12.

FIG. 16 is an explanatory diagram illustrating an example of operation of a service serving as the communication apparatus 11 and the mobile terminal 100 serving as the communication apparatus 12.

FIG. 17 is a diagram illustrating an overview of a second example of communication performed by the communication apparatus 12.

FIG. 18 is a diagram illustrating an overview of a third example of communication performed by the communication apparatus 12.

MODES FOR CARRYING OUT THE INVENTION

Embodiment of Communication System to which the Technology is Applied

FIG. 1 is a block diagram illustrating a configuration example of an embodiment of a communication system to which the technology is applied.

In FIG. 1, the communication system includes communication apparatuses 11 and 12.

The communication apparatuses 11 and 12 perform communication in a predetermined communication method to exchange data therebetween.

In the communication apparatuses 11 and 12, it is possible to carry out, for example, short-distance wireless communication, communication via a mobile-phone network, communication via a LAN (Local Area Network), communication to be performed using the communication apparatus 11 as a server on the Internet, or any other communication.

Examples of the short-distance wireless communication include the TransferJet (registered trademark) and electric field communication in addition to the above-described NFC communication.

The TransferJet (registered trademark) is a communication method that allows data to be transferred at high speed using a signal in 4.48 GHz band. According to the TransferJet (registered trademark), for example, in a similar manner to the NFC communication, holding one of the communication apparatuses 11 and 12 over the other allows data to be exchanged between the communication apparatuses 11 and 12.

The electric field communication is communication utilizing an electric field, and an example of such electric field communication includes BAN (Body Area Network) communication that uses a human body as a communication medium. In the BAN communication, for example, a user carrying one of the communication apparatuses 11 and 12 touches the other, which makes it possible to exchange data between the communication apparatuses 11 and 12.

It is to be noted that, hereinafter for ease of explanation, unless otherwise noted, each of the communication apparatuses 11 and 12 has at least the built-in IC card functional capabilities, and data is exchanged using the NFC communication between the communication apparatuses 11 and 12. In this case, it is possible to employ an initiator apparatus such as an R/W, for example, as the communication apparatus 11, and to employ a target apparatus such as an IC card and a mobile terminal that are carried by a user, for example, as the communication apparatus 12.

Configuration Example of Communication Apparatus 11

FIG. 2 is a block diagram illustrating a configuration example of the communication apparatus 11 illustrated in FIG. 1

In FIG. 2, the communication apparatus 11 includes a communication section 21, a control section 22, and a memory 23.

The communication section 21 carries out the NFC communication with the communication apparatus 12, or any other communication apparatus that enables the NFC communication. It is to be noted that, as functions of the communication section 21, one or more of functions of performing communication other than the NFC communication, that is, for example, a function of performing communication via a mobile-phone network, a function of performing communication via the Internet, a function of performing the BAN communication, etc. are mountable.

The control section 22 has a built-in processor such as a CPU (Central Processing Unit), for example, and executes programs stored on the memory 23 to control the whole communication apparatus 11 including the communication section 21, and to perform other various kinds of processing.

The memory 23 stores programs to be executed by the control section 22, and necessary data. The memory 23 allows for secure storage of data (especially, data regarding keys to be used for encryption/decryption, and electronic values, etc.)

First Configuration Example of Communication Apparatus 12

FIG. 3 is a block diagram illustrating a configuration example of an IC card as a first configuration example of the communication apparatus 12 illustrated in FIG. 1.

In FIG. 3, an IC card 30 serving as the communication apparatus 12 includes an IC card functional section 31 and an antenna 32.

The IC card functional section 31 performs a process of providing the IC card functional capabilities such as the NFC communication.

The antenna 32 transmits and receives radio waves with the R/W serving as the communication apparatus 11.

In the IC card 30, the IC card functional section 31 includes, for example, an IC card LSI 40 that is a single-chip LSI.

The IC card LSI 40 includes a wireless communication section 41, a control section 42, a program ROM (Read-Only Memory) 43, and a non-volatile memory 44.

The wireless communication section 41 carries out the NFC communication with the communication apparatus 11 or any other communication apparatus that enables the NFC communication through the antenna 32.

The control section 22 has a built-in processor (sequencer), for example, and executes programs stored on the program ROM 43 to perform various kinds of processing.

The program ROM 43 stores programs to be executed by the control section 22, and data that is necessary for the processing performed by the control section 22.

The non-volatile memory 44 stores, for example, electronic values etc. such as electronic money.

Format of Signal in NFC Communication

FIG. 4 is a diagram illustrating a format of a signal to be transmitted and received in the NFC communication between the communication apparatuses 11 and 12.

In the signal to be transmitted and received in the NFC communication, a preamble, a sync code, and a packet are provided in this order.

The preamble represents a heading of data. The sync code represents that a method of the NFC communication falls under one of types A, B, and C.

The packet includes at least a length, a command code, and a check sum. The packet illustrated in FIG. 4 is a packet for a polling command, in which the length, the command code, a system code, a time slot number, and the check sum are provided in this order.

The length represents a size of the packet.

The command code represents a command. In FIG. 4, the command code is 0x00. The command code 0x00 indicates that the command is a polling command.

The system code is assigned for each of issuers (operating companies) of the IC card 30. Only the IC card 30 of the issuer to which the system code is assigned responds to the polling command. The system code is allowed to adopt 0xFFFF (two 0xFF codes) as a wild card. In a case where the system code is 0xFFFF as the wild card, the IC cards 30 of all the issuers respond to the polling command.

The time slot number represents a number that identifies a time slot.

In a case where the R/W serving as the communication apparatus 11 transmits the polling command, and the IC card 30 serving as the communication apparatus 12 returns a response to the polling command, the response includes IDm that is an ID (Identification) inherent to the IC card 30.

After the R/W serving as the communication apparatus 11 receives the response to the polling command from the IC card 30, and recognizes the IDm of the IC card 30 that is included in the response, the R/W makes it possible to designate the IDm and to transmit a command (the packet).

In a case where the IDm is designated in the packet that the R/W serving as the communication apparatus 11 transmits, only the IC card 30 whose IDm is designated in the packet responds to the packet.

The check sum is used for error detection.

In the NFC communication, the R/W serving as the communication apparatus 11 performs polling by transmitting the packet of the polling command illustrated in FIG. 4.

When the IC card 30 serving as the communication apparatus 12 comes close to the R/W serving as the communication apparatus 11, the IC card 30 receives the packet of the polling command from the communication apparatus 11 and returns the response including the IDm of the IC card 30 to the packet of the polling command.

The communication apparatus 11 recognizes the IDm of the IC card 30 on the basis of the response from the IC card 30, and designates the IDm of the IC card 30 to transmit the packet of an Authentication command that requests mutual authentication as appropriate.

When the IC card 30 whose IDm is designated in the packet of the Authentication command receives the packet, the IC card 30 carries out mutual authentication with the R/W serving as the communication apparatus 11.

It is to be noted that IC cards other than the IC card 30 whose IDm is designated in the packet of the Authentication command perform no response (reaction) even if the IC cards are able to receive the packet.

Example of Operation of R/W Serving as Communication Apparatus 11 and IC Card 30 Serving as Communication Apparatus 12

FIG. 5 is an explanatory diagram illustrating an example of operation of the R/W serving as the communication apparatus 11 and the IC card 30 serving as the communication apparatus 12.

In a step S11, the communication section 21 (FIG. 2) of the communication apparatus 11 (the R/W) repeats transmission of the polling command (the packet thereof) in a cyclic manner.

In a case where the IC card 30 serving as the communication apparatus 12 lies outside a receiving area, that is, the IC card 30 does not come close enough to the communication apparatus 11 to permit reception of the polling command transmitted by the communication apparatus 11, the IC card 30 performs no response (is unable to respond) to the polling command.

Thereafter, in a case where the IC card 30 comes close to the communication apparatus 11 in a manner of being held over the communication apparatus 11, or the like, the wireless communication section 41 (FIG. 3) of the IC card 30 receives the polling command from the communication apparatus 11 in a step S21.

In a step S22, the wireless communication section 41 of the IC card 30 transmits a response including the IDm of the IC card 30 to the communication apparatus 11 to respond to the polling command.

In a step S12, the communication section 21 of the communication apparatus 11 receives the response from the IC card 30.

In a step S13, the communication section 21 of the communication apparatus 11 designates the IDm included in the response from the IC card 30 to request mutual authentication, thereby carrying out the mutual authentication with the IC card 30 that is identified by the IDm.

In a case of unsuccessful mutual authentication in the step S13, the communication apparatuses 11 and 12 do not carry out subsequent processes.

On the contrary, in a case of successful mutual authentication in the step S13, data exchange for predetermined processing in the NFC communication is carried out between the communication apparatuses 11 and 12 in a step S14.

[Overview of Mutual Authentication]

FIG. 6 is an explanatory diagram illustrating an overview of a process of the mutual authentication in the step S13 in FIG. 5 that is carried out between the communication apparatuses 11 and 12.

The mutual authentication is performed between the communication apparatuses 11 and 12 with use of a common key system, for example. In this case, each of the communication apparatuses 11 and 12 stores a common key in a secure manner.

In a step S31, the communication apparatus 11 generates a random number RA to transmit the random number RA to the IC card 30 serving as the communication apparatus 12. The communication apparatus 12 receives the random number RA from the communication apparatus 11.

The communication apparatus 12 generates a random number RB in a step S41, and encrypts, with use of a common key K, a concatenation string RB∥RA in which the random number RB and the random number RA are concatenated with each other to generate a cipher Enc (K, RB∥RA) in a step S42.

In a step S43, the communication apparatus 12 transmits the cipher Enc (K, RB∥RA) to the communication apparatus 11. The communication apparatus 11 receives the cipher Enc (K, RB∥RA) from the communication apparatus 12.

In a step S33, the communication apparatus 11 decrypts the cipher Enc (K, RB∥RA) from the communication apparatus 12 into the concatenation string RB∥RA using the common key K. Further, the communication apparatus 11 authenticates the communication apparatus 12 as a communication peer depending on whether or not the random number RA included in the concatenation string RB∥RA and the random number RA generated in the step S31 are matched.

In a case of unsuccessful authentication of the communication apparatus 12, that is, in a case where the random number RA included in the concatenation string RB∥RA and the random number RA generated in the step S31 are not matched, the communication apparatus 11 does not carry out subsequent processes.

On the contrary, in a case of successful authentication of the communication apparatus 12, that is, in a case where the random number RA included in the concatenation string RB∥RA and the random number RA generated in the step S31 are matched, the communication apparatus 11 generates a session key KS in a step S34.

In a step S35, the communication apparatus 11 encrypts, with use of the common key K, a concatenation string RA∥RB∥KS in which the random numbers RA and RB obtained by decrypting the cipher Enc (K, RB∥RA) are concatenated with the session key to generate a cipher Enc (K, RA∥RB∥KS).

In a step S36, the communication apparatus 12 transmits the cipher Enc (K, RA∥RB∥KS) to the communication apparatus 12. The communication apparatus 12 receives the cipher Enc (K, RA∥RB∥KS) from the communication apparatus 11.

In a step S44, the communication apparatus 12 decrypts the cipher Enc (K, RA∥RB∥KS) from the communication apparatus 11 into the concatenation string RA∥RB∥KS with use of the common key K. Further, the communication apparatus 12 authenticates the communication apparatus 11 as a communication peer depending on whether or not the random number RB included in the concatenation string RA∥RB∥KS and the random number RB generated in the step S41 are matched.

In a case of unsuccessful authentication of the communication apparatus 11, that is, in a case where the random number RB included in the concatenation string RA∥RB∥KS and the random number RB generated in the step S41 are not matched, the communication apparatus 12 does not carry out subsequent processes. However, the communication apparatus 12 is able to transmit a message indicating the unsuccessful authentication to the communication apparatus 11.

On the contrary, in a case of successful authentication of the communication apparatus 11, that is, in a case where the random number RB included in the concatenation string RA∥RB∥KS and the random number RB generated in the step S41 are matched, the communication apparatus 12 transmits a message indicating the successful authentication to the communication apparatus 11 in a step S45, resulting in completion of a process of the mutual authentication.

In a case of successful mutual authentication of the communication apparatuses 11 and 12, data exchange for predetermined processing is carried out between the communication apparatuses 11 and 12, as described in FIG. 5. However, such data exchange for the predetermined processing is carried out in a secure manner of encrypting data with use of the session key KS obtained by the mutual authentication.

It is to be noted that, in performing the data exchange for the predetermined processing in the communication apparatuses 11 and 12, the mutual authentication is not mandatory.

In other words, the data to be exchanged between the communication apparatuses 11 and 12 includes data (files) for which reading and writing without the mutual authentication is permitted, and it is possible to carry out such data exchange for the predetermined processing without the mutual authentication.

However, in carrying out the data exchange for the predetermined processing without performing the mutual authentication, the data exchange for the predetermined processing is carried out even if the communication apparatuses 11 and 12 are unauthorized apparatuses. Further, the data exchange for the predetermined processing is performed using a plain text.

Example of Data Exchange for Predetermined Processing

FIG. 7 is an explanatory diagram illustrating an example of data exchange for predetermined processing in the step S14 in FIG. 5 that is carried out between the communication apparatuses 11 and 12.

In other words, FIG. 7 illustrates an example of processing in which electronic money is stored on the non-volatile memory 44 (FIG. 3) in the IC card 30 serving as the communication apparatus 12, and settlement is made using the electronic money.

In a step S51, the communication apparatus 11 transmits, to the communication apparatus 12, a read request to read a stored value of electronic money, and the communication apparatus 12 receives the read request.

In a step S61, the communication apparatus 12 reads out the stored value of the electronic money stored on the non-volatile memory 44 in response to the read request from the communication apparatus 11, and transmits the readout value to the communication apparatus 11.

The communication apparatus 11 receives the stored value of the electronic money from the communication apparatus 12, and performs reduction processing to reduce a predetermined amount of money from the stored value of the electronic money from the communication apparatus 12 in a step S52.

In a step S53, the communication apparatus 11 transmits, to the communication apparatus 12, an update request to update the stored value of the electronic money to a reduced value obtained as a result of the reduction processing in the step S52.

The communication apparatus 12 receives the update request from the communication apparatus 11, and updates the stored value of the electronic money stored on the non-volatile memory 44 (FIG. 3) in response to the update request from the communication apparatus 11 in a step S62.

In a step S63, the communication apparatus 12 transmits a response to the update request from the communication apparatus 11, and the communication apparatus 11 receives the response from the communication apparatus 12.

In a step S54, the communication apparatus 11 transmits, to the communication apparatus 12, a reread request to reread the stored value of the electronic money, and the communication apparatus 12 receives the reread request.

In the step S54, the communication apparatus 12 reads out the stored value of the electronic money stored on the non-volatile memory 44, that is, the stored value of the electronic money that is updated in accordance with the update request in response to the reread request from the communication apparatus 11, and transmits the readout value to the communication apparatus 11.

In a step S55, the communication apparatus 11 receives the stored value of the electronic money from the communication apparatus 12, and confirms that the stored value matches the reduced value obtained as a result of the reduction processing in the step S52.

It is to be noted that the reduction processing is performed by the communication apparatus 11 in FIG. 7; however, the communication apparatus 12 is also able to perform the reduction processing alternatively. In a case where the reduction processing is performed by the communication apparatus 12, the communication apparatus 11 transmits a reduction command to perform the reduction processing to the communication apparatus 12, and the communication apparatus 12 performs the reduction processing in accordance with the reduction command.

Second Configuration Example of Communication Apparatus 12

FIG. 8 is a block diagram illustrating a configuration example of a mobile terminal as a second configuration example of the communication apparatus 12 illustrated in FIG. 1.

In FIG. 8, a mobile terminal 50 serving as the communication apparatus 12 includes an IC card functional section 51, an antenna 52, and a host CPU (Central Processing Unit) 53.

The IC card functional section 51 performs a process of providing the IC card functional capabilities such as the NFC communication in a similar manner to the IC card functional section 31 of the IC card 30 illustrated in FIG. 3.

The antenna 52 transmits and receives radio waves with the R/W serving as the communication apparatus 11.

The host CPU 53 carries out various kinds of processing that cause the mobile terminal 50 to function as a mobile terminal such as a smartphone and a mobile phone.

In the mobile terminal 50, the IC card functional section 51 includes a communication chip 60 and an SE (Secure Element) 70.

The communication chip 60 is, for example, a single-chip LSI, and functions as an IF (Interface) that performs the NFC communication with the communication apparatus 11 or any other communication apparatus that enables the NFC communication. Further, the communication chip 60 functions as the IF that performs wired communication with the host CPU 53, the SE 70, or any other block that enables the wired communication.

For example, when a packet is transmitted from the communication apparatus 11, the communication chip 60 determines whether or not routing of the packet to the host CPU 53 and/or the SE 70 is necessary.

In a case where the routing of the packet from the communication apparatus 11 is unnecessary, the communication chip 60 performs necessary processing depending on the packet from the communication apparatus 11, and returns a response to the packet to the communication apparatus 11.

On the contrary, in a case where the routing of the packet from the communication apparatus 11 is necessary, the communication chip 60 performs the routing of the packet from the communication apparatus 11 to the host CPU 53 and/or the SE 70. Subsequently, the communication chip 60 waits for return of a response to the packet from the communication apparatus 11 from the host CPU 53 and/or the SE 70, and thereafter receives the response, and returns the response to the communication apparatus 11.

Therefore, in a case where the routing of the packet from the communication apparatus 11 is necessary, the communication chip 60 functions as a communication channel between the communication apparatus 11 and the host CPU 53 and/or the SE 70, and necessary data processing (data exchange) is carried out between the communication apparatus 11 and the host CPU 53 and/or the SE 70.

The communication chip 60 includes a wireless communication section 61, a control section 62, a ROM 63, and a wired communication section 64.

The wireless communication section 61 carries out the NFC communication with the communication apparatus 11 or any other communication apparatus that enables the NFC communication through the antenna 52.

The control section 62 has, for example, a built-in processor, and executes programs stored on the ROM 63 to perform various kinds of processing.

The ROM 63 stores programs to be executed by the control section 62, and necessary data for processing performed by the control section 62.

The wired communication section 64 carries out wired communication with the host CPU 53, the SE 70, or any other block that enables the wired communication.

The SE 70 is, for example, a single-chip LSI, and carries out management (such as storage) of electronic values, etc. such as electronic money in a secure manner.

The SE 70 includes a wired communication section 71, a control section 72, and a non-volatile memory 73.

The wired communication section 71 carries out wired communication with a block that enables the wired communication, such as the communication chip 60 (the wired communication section 64 thereof).

The control section 72 has, for example, a built-in processor, and executes programs stored on the non-volatile memory 73 to perform various kinds of processing.

The non-volatile memory 73 stores the electronic values such as electronic money, for example. Further, the non-volatile memory 73 stores programs to be executed by the control section 72, and necessary data for processing performed by the control section 72.

Here, as far as the IC card functional capabilities are concerned, the technology development thereof was originally carried out on the premise that IC card functional capabilities are mounted on the IC card 30, and thereafter the IC card functional capabilities have come to be mounted on the mobile terminal 50 such as a mobile phone. In mounting of the IC card functional capabilities onto the mobile terminal 50, the IC card functional capabilities of the IC card 30 have been employed almost as they are.

Further, the IC card functional capabilities are originally mounted on the single-chip IC card LSI 40, as illustrated in FIG. 3. Thereafter, the IC card functional capabilities have come to be separately mounted on the communication chip 60 and the SE 70 each of which is a discrete chip, as illustrated in FIG. 8.

In achieving the IC card functional capabilities, it is necessary to manage the electronic value, etc. in a secure manner, and therefore it is necessary to give tamper-resistance to a chip that stores the electronic value.

In a case where the IC card functional capabilities are mounted on the single-chip IC card LSI 40, as illustrated in FIG. 3, it is necessary to give the tamper resistance to the whole IC card LSI 40 including the wireless communication section 41 that does not need the tamper resistance. Giving the tamper resistance to even the wireless communication section 41 that does not need the tamper resistance in such a manner is likely to cause an increase in manufacturing costs of the IC card LSI 40.

On the contrary, in a case where the IC card functional capabilities are separately mounted on the communication chip 60 serving as a chip to perform the NFC communication, and the SE 70 that manages the electronic value, etc. in a secure manner, as illustrated in FIG. 8, it is necessary to give the tamper resistance to the SE 70, but it is unnecessary to give the tamper resistance to the communication chip 60. As a result, it is possible to suppress overall manufacturing costs of the communication chip 60 and the SE 70 as compared with a case where the tamper resistance is given to the single-chip IC card LSI 40.

Example of Operation of R/W Serving as Communication Apparatus 11 and Mobile Terminal 50 Serving as Communication Apparatus 12

FIG. 9 is an explanatory diagram illustrating an example of operation of the R/W serving as the communication apparatus 11 and the mobile terminal 50 serving as the communication apparatus 12.

In a step S71, the communication section 21 (FIG. 2) of the communication apparatus 11 (the R/W) repeats transmission of the polling command (the packet thereof) in a cyclic manner.

In a case where the mobile terminal 50 serving as the communication apparatus 12 lies outside a receiving area, that is, the mobile terminal 50 does not come close enough to the communication apparatus 11 to permit reception of the polling command transmitted by the communication apparatus 11, the mobile terminal 50 performs no response (is unable to respond) to the polling command.

Thereafter, in a case where the mobile terminal 50 comes close to the communication apparatus 11 in a manner of being held over the communication apparatus 11, or the like, the communication chip 60 (FIG. 8) of the mobile terminal 50 receives the polling command (the packet thereof) from the communication apparatus 11 in a step S81.

Here, upon reception of a signal (data) for the NFC communication (hereinafter also referred to as NFC communication data) that is described in FIG. 4, the communication chip 60 performs routing of a packet included in the NFC communication data as appropriate.

For example, the communication chip 60 performs routing of the packet included in the NFC communication data to the host CPU 53 or the SE 70 inside the mobile terminal 50.

Further, in a case where the mobile terminal 50 incorporates an unillustrated SIM (Subscriber Identity Module) card or an unillustrated SD (memory) card, the communication chip 60 performs routing of the packet included in the NFC communication data to the SIM card or the SIM card that is incorporated in the mobile terminal 50 as appropriate.

In performing routing of the packet included in the NFC communication data, the communication chip 60 (the control section 62 thereof) carries out a routing decision that determines a routing destination including the presence or absence of routing.

It is possible to perform the routing decision on the basis of a command code of the packet (FIG. 4) that is included in the NFC communication data.

For example, in a case where the command code indicates a polling command, the communication chip 60 determines that a routing destination of the packet included in the NFC communication data is the SE 70, and performs routing of the packet to the SE 70.

As an alternative, it is possible to perform the routing decision on the basis of a sync code included in the NFC communication data, for example.

For example, in a case where the sync code is 0xFFAA, the communication chip 60 is able to determine that a routing destination of the packet included in the NFC communication data is the SE 70 to perform routing of the packet to the SE 70. Further, for example, in a case where the sync code is 0xABCD, the communication chip 60 is able to determine that a routing destination of the packet included in the NFC communication data is the SIM card to perform routing of the packet to the SIM card.

In addition, it is also possible to perform the routing decision on the basis of a modulation method of the NFC communication data, for example.

For example, in a case where the modulation method of the NFC communication data is 10% ASK (Amplitude Shift Keying) modulation, the communication chip 60 is able to determine that a routing destination of the packet included in the NFC communication data is the SE 70 to perform routing of the packet to the SE 70. Further, for example, in a case where the modulation method of the NFC communication data is PSK (Phase Shift Keying) modulation, the communication chip 60 is able to determine that a routing destination of the packet included in the NFC communication data is the SIM card to perform routing of the packet to the SIM card.

The communication chip 60 (FIG. 8) of the mobile terminal 50 receives a polling command from the communication apparatus 11 in a step S81, and thereafter carries out the routing decision. In such a routing decision, the communication chip 60 determines that a routing destination of the polling command is the SE 70, and performs routing of the polling command (the packet thereof) from the communication apparatus 11 to the SE 70.

In a step S91, the SE 70 of the mobile terminal 50 receives the polling command from the communication chip 70 to determine whether or not to respond to the polling command on the basis of a system code (FIG. 4) that is included in the polling command.

Here, in the SE 70, the non-volatile memory 73 (FIG. 8) stores the system code assigned to an issuer of the IC card functional section 51, and the SE 70 (the control section 72 thereof) determines whether or not to respond to the polling command by comparing the system code included in the polling command with the system code stored on the non-volatile memory 73.

It is to be noted that a decision whether or not to respond to the polling command is permitted to be performed by the communication chip 60, not by the SE 70.

In a case where the system code included in the polling command and the system code stored on the non-volatile memory 73 are not matched, and further the system code included in the polling command is not a wild card (0xFFFF), the SE 70 gives no response to the polling command.

In this case, the SE 70 gives no response to the communication chip 60, or returns a message indicating that the system code is not a system code to respond to the polling command to the communication chip 60. In a case where the SE 70 gives no response, or returns the message indicating that the system code is not a system code to respond to in the polling command, the communication chip 60 gives no response to the polling command from the communication apparatus 11.

On the contrary, in a case where the system code included in the polling command and the system code stored on the non-volatile memory 73 are matched, or the system code included in the polling command is the wild card (0xFFFF), the SE 70 determines to respond to the polling command, and transmits a response to the polling command (hereinafter also referred to as a polling response) to the communication chip 60 in a step S92.

In a step S82, the communication chip 60 receives the polling response from the SE 70, and transmits the polling response to the communication apparatus 11 that has transmitted the polling command through the NFC communication. It is to be noted that the polling response includes the IDm of the mobile terminal 50.

In a step S72, the communication section 21 of the communication apparatus 11 receives the polling response from the mobile terminal 50 (the communication chip 60 thereof).

In a step S73, the communication section 21 of the communication apparatus 11 designates the IDm included in the polling response from the mobile terminal 50 to request the mutual authentication. In such a manner, the communication section 21 carries out the mutual authentication similar to that in the step S13 in FIG. 5 with the mobile terminal 50 identified by the IDm.

In a case of the unsuccessful mutual authentication in the step S73, the communication apparatus 11 and the mobile terminal 50 serving as the communication apparatus 12 do not carry out subsequent processes.

Meanwhile, in a case of the successful mutual authentication in the step S73, data exchange for predetermined processing through the NFC communication is carried out between the communication apparatus 11 and the mobile terminal 50 in a step S74 in a similar manner to the step S14 in FIG. 5.

Here, as described previously, the IC card functional capabilities are originally mounted on the IC card 30, and thereafter have come to be mounted on the mobile terminal 50 such as a mobile phone. However, since a host CPU such as the host CPU 53 that manages the IC card functional capabilities is not present in the IC card 30, the host CPU such as the host CPU 53 does not get involved in processing of the IC card LSI 40 (FIG. 3) and processing of the communication chip 60 and the SE 70 (FIG. 8) as the IC card functional capabilities.

As described above, a configuration in which the host CPU does not get involved in the IC card functional capabilities in the IC card 30 is taken over in mounting the IC card functional capabilities on the mobile terminal 50, and therefore the host CPU 53 does not get involved in the processing of the communication chip 60 and the SE 70 as the IC card functional capabilities in the mobile terminal 50, as described in FIG. 9.

In other words, in the mobile terminal 50, the processing to be performed as the IC card functional capabilities is the processing closed to two chips, i.e., the communication chip 60 and the SE 70, and thus the host CPU 53 does not get involved in the processing to be performed as the IC card functional capabilities, except that a message indicating that the processing as the IC card functional capabilities has been performed is notified from the communication chip 60 to the host CPU 53 at the end of the processing as the IC card functional capabilities.

Meanwhile, for example, in a case where the mobile terminal 50 falls into the hands of a third person due to theft, etc., it is demanded to prevent such illegal use of the mobile terminal 50 by the third person such as using, by the third person, the mobile terminal 50 that is a mobile terminal possessed by someone else to make electronic settlement (settlement with use of electronic money), that is, illegal use of electronic value stored on the mobile terminal 50.

An example of a method of preventing the illegal use of the electronic value by a third person includes a method of performing personal authentication to check whether or not a user carrying the mobile terminal 50 is a valid user (a possessor of the mobile terminal 50, or a user given permission of the use by the possessor).

In other words, for example, at the point of use of electronic money or electronic ticket that serves as the electronic value stored on the mobile terminal 50, the host CPU 53 executes the personal authentication. The host CPU 53 permits the use of the electronic value only in a case of the successful personal authentication, and limits (prohibits) the use of the electronic value in a case of the unsuccessful personal authentication. Such a manner makes it possible to prevent the illegal use of the electronic value by a third person.

However, in the mobile terminal 50, as described above, the host CPU 53 does not get involved in the processing to be performed as the IC card functional capabilities, and therefore the host CPU 53 has difficulty in executing the personal authentication at the point of use of the electronic value.

Here, examples of a method of the personal authentication to be executed by the host CPU 53 include a method using fingerprint matching, a method using password authentication, and a method using BAN communication, etc.

In the personal authentication with use of the fingerprint matching, a fingerprint of a user is photographed, and the fingerprint is verified for matching. In the personal authentication with use of the password authentication, a user is asked to enter a password, and the password is verified for matching. In the personal authentication with use of the BAN communication, it is indirectly determined whether a user attempting to use the electronic value is a valid user depending on whether a predetermined BAN device having a BAN communication capability that is different from the mobile terminal 50 is detectable through the BAN communication, that is, whether a user carries the predetermined BAN device.

As described above, in the mobile terminal 50, the host CPU 53 does not get involved in the processing to be performed as the IC card functional capabilities, and therefore the host CPU 53 has difficulty in executing the personal authentication at the point of use of the electronic value.

Accordingly, a method is considered that prevents the illegal use of the electronic value by a third person by making the communication chip 60 and/or the SE 70 execute the personal authentication instead of the host CPU 53.

However, the demand for performing the personal authentication may be often different in each of applications using the electronic value, and it may be often difficult to assign the communication chip 60 and/or the SE 70 that are not considered to have sufficient resources to execute complicated processing meeting such a demand.

In other words, for example, the personal authentication is not demanded in applications that make only small-sum settlement as settlement of the electronic money; however, it is likely to demand the personal authentication in applications where large-sum settlement may be often made as settlement of the electronic money.

Further, in applications that make settlement of the electronic money, the personal authentication is not demanded in making small-sum settlement; however, it is likely to demand the personal authentication in making large-sum settlement.

In addition, for example, in applications that make settlement (authentication) of an electronic ticket, the personal authentication may be demanded, or may be not demanded depending on the intent, etc. of an issuer of the electronic ticket.

It could impose heavy loading on the communication chip 60 and/or the SE 70 to meet the above-described demands for the personal authentication that are different in each of applications using the electronic value.

As described above, in the mobile terminal 50, the host CPU 53 does not get involved in the processing to be performed as the IC card functional capabilities, except that a message indicating that the processing as the IC card functional capabilities has been performed is notified. Therefore, the host CPU 53 has difficulty in executing the personal authentication at the point of use of the electronic value.

Accordingly, the technology prevents the illegal use of the electronic value by a third person by newly adding a personal authentication request command requesting the personal authentication as a command for the NFC communication to a host CPU such as the host CPU 53 that controls a whole apparatus provided with the IC card functional capabilities to make the host CPU execute the personal authentication in accordance with the personal authentication request command.

Third Configuration Example of Communication Apparatus 12

FIG. 10 is a block diagram illustrating a configuration example of a mobile terminal as a third configuration example of the communication apparatus 12 illustrated in FIG. 1.

In FIG. 10, a mobile terminal 100 serving as the communication apparatus 12 includes an NFC communication section 110, a BAN communication section 120, an SE 130, a host CPU 140, and a memory 141.

The NFC communication section 110 is, for example, a single-chip LSI, and carries out the NFC communication (including routing to be executed by the communication chip 60 in FIG. 8), (wired) communication with the SE 130, and (wired) communication with the host CPU 140.

In other words, the NFC communication section 110 includes an antenna 111, an RF/IF 112, a communication IF 113, and a host communication IF 114.

The antenna 111 transmits and receives RF (Radio Frequency) signals for the NFC communication in the form of radio waves (magnetic fields) with the R/W serving as the communication apparatus 11.

The RF/IF 112 functions as an IF that performs the NFC communication with the communication apparatus 11 or any other communication apparatus that enables the NFC communication through the antenna 111.

The communication IF 113 functions as an IF that performs communication with the SE 130 through the BAN communication section 120 (a communication control section 123 to be described later thereof).

The host communication IF 114 functions as an IF that performs communication with the host CPU 140.

The BAN communication section 120 is, for example, a single-chip LSI, and carries out the BAN communication, communication with the SE 130, and communication with the host CPU 140.

In other words, the BAN communication section 120 includes an electrode 121, an RF/IF 122, a communication control section 123, and a host communication IF 124.

In the electrode 121, an electric field (EF (Electric Field)) produced by a voltage corresponding to transmission data to be transmitted from the BAN device 150, or any other communication apparatus that enables the BAN communication causes generation of a voltage corresponding to the above-described transmission data.

Further, a voltage corresponding to transmission data to be transmitted by the RF/IF 122 is applied to the electrode 121 from the RF/IF 122.

The RF/IF 122 functions as an IF that performs the BAN communication with the BAN device 150 or any other communication apparatus that enables the BAN communication through the electrode 121.

The communication control section 123 performs control to select a communication peer of the SE 130 in an alternative manner in a sense.

In other words, the communication control section 123 selects the NFC communication section 110 or the BAN communication section 120 as the communication peer of the SE 130, and ensures (switches) a communication path to allow the SE 130 to perform communication only with the communication peer.

It is to be noted that, in the present embodiment, the communication control section 123 selects, by default, the NFC communication section 110 as the communication peer of the SE 130, for example, from the NFC communication section 110 and the BAN communication section 120.

In other words, in the mobile terminal 100, the NFC communication section 110 and the BAN communication section 120 share the SE 130.

Meanwhile, the specifications of the mobile terminal 100 are not preferably changed whenever practicable from the specifications of existing mobile terminals such as currently-available mobile phones and smartphones.

Some of the existing mobile terminals have the IC functional capabilities that are achieved with use of the NFC communication section 110 and the SE 130, and addition of the BAN communication section 120 to such existing mobile terminals allows the mobile terminal 100 to be achieved.

In the present embodiment, to ensure that the specifications of the mobile terminal 100 are not changed whenever practicable from the specifications of the existing mobile terminal, the BAN communication section 120 is inserted at a communication path between the NFC communication section 110 and the SE 130, and the BAN communication section 120 selects a communication peer of the SE 130 in an alternative manner, while selecting, by default, the NFC communication section 110 as the communication peer of the SE 130. In such a manner, the NFC communication section 110 performs communication with the SE 130, as with the case of the existing mobile terminal.

It is to be noted that it is possible to configure the SE 130 having two IFs, and to couple the communication IF 113 to one of the two IFs, while coupling the communication control section 123 to the other IF. In such a case, the communication control section 123 functions as an IF that performs communication with the SE 130 as with the communication IF 113, and does not select a communication peer of the SE 130 in an alternative manner. Further, both of the NFC communication section 110 (the communication IF 113) and the BAN communication section 120 (the communication control section 123) attempt to gain access to the SE 130 simultaneously in some cases. In such a case, the SE 130 determines, in accordance with a predetermined rule, which access from the NFC communication section 110 or the BAN communication section 120 is prioritized.

The host communication IF 124 functions as an IF that performs communication with the host CPU 140.

The SE 130 is, for example, a single-chip LSI, and is configured in a manner similar to the SE 70 illustrated in FIG. 8. Therefore, the SE 130 manages, in a secure manner, the electronic value such as electronic money.

Here, in FIG. 10, the NFC communication section 110 and the BAN communication section 120 allow for access to the SE 130 in an alternative manner. In other words, under an identical timing condition, only one of the NFC communication section 110 and the BAN communication section 120 is allowed to gain access to the SE 130, and thus both of the NFC communication section 110 and the BAN communication section 120 are not allowed to gain access to the SE 130 simultaneously.

Further, it is possible to employ, for example, a secure LSI dedicated for the mobile terminal 100 as the SE 130. In addition, it is possible to employ, for example, an SIM card or a (micro) SD card that are attachable to the mobile terminal 100 as the SE 130. It is possible to provide more than one of the dedicated secure LSI, the SIM card, and the SD card as described above on the mobile terminal 100 as the SE 130.

The host CPU 140 executes programs stored on the memory 141 to perform various kind of processing that cause the mobile terminal 100 to function as the mobile terminal such as a smartphone and a mobile phone.

It is to be noted that the host CPU 140 is able to recognize that the communication is being carried out between the NFC communication section 110 or the BAN communication section 120 and the SE 130; however, does not get involved in the content of the processing being performed between the NFC communication section 110 or the BAN communication section 120 and the SE 130.

The memory 141 stores programs to be executed by the host CPU 140, and necessary data.

In the mobile terminal 100 serving as the communication apparatus 12 that is configured as describe above, the NFC communication section 110 allows the NFC communication to be carried out with the R/W serving as the communication apparatus 11 that enables the NFC communication.

Further, in the mobile terminal 100, the BAN communication section 120 allows the BAN communication to be carried out with the BAN device 150 that enables the BAN communication.

In addition, in the mobile terminal 100, the NFC communication section 110 and the BAN communication section 120 allow for access to the SE 130 (in an alternative manner).

Therefore, the mobile terminal 100 makes it possible to make a variety of settlements using, for example, the electronic value to be performed as the predetermined processing through data exchange in the NFC communication, or data exchange in the BAN communication.

Further, the mobile terminal 100 illustrated in FIG. 10 allows for personal authentication of a user using the mobile terminal 100. The mobile terminal 100 allows the personal authentication of a user to be carried out through the BAN communication, for example.

In other words, it is possible to register a BAN device to be used for the personal authentication in the mobile terminal 100. In a case where the BAN device that is registered in the mobile terminal 100 is also referred to as a registered device, the personal authentication using the BAN communication is carried out by detecting the registered device by the BAN communication section 120.

For example, if the BAN device 150 is registered in the mobile terminal 100 as the registered device at the present moment in FIG. 10, in a case where a user using the mobile terminal 100 carries the BAN device 150, the BAN communication is carried out between the BAN communication section 120 and the BAN device 150 using a body of the user as a communication medium, leading to detection of the BAN device 150 serving as the registered device.

On the contrary, in a case where a user using the mobile terminal 100 does not carry the BAN device 150, the BAN communication is not allowed to be carried out between the BAN communication section 120 and the BAN device 150, and the BAN device 150 serving as the registered device is undetectable.

This makes it possible to perform the personal authentication of which success or failure is determined depending on whether a user using the mobile terminal 100 carries the BAN device 150.

In other words, in a case where a user using the mobile terminal 100 carries the BAN device 150, the BAN device 150 serving as the registered device is detected through the BAN communication, resulting in success of the personal authentication.

On the contrary, in a case where a user using the mobile terminal 100 does not carry the BAN device 150, the BAN device 150 serving as the registered device is undetectable through the BAN communication, resulting in failure of the personal authentication.

As the BAN device 150 to be used for the personal authentication, it is possible to employ BAN devices that a user often wears on a daily basis, such as a wristwatch-type wearable device and a glasses-type wearable device, for example.

It is to be noted that, for the personal authentication through the BAN communication, mutual authentication (BAN mutual authentication) is carried out between the mobile terminal 100 and the BAN device 150 prior to the personal authentication, and thereafter the personal authentication is allowed to be performed only in a case of the successful mutual authentication.

Configuration Example of BAN Device 150

FIG. 11 is a block diagram illustrating a configuration example of the BAN device 150 to be used for the personal authentication.

In FIG. 11, the BAN device 150 includes a BAN communication section 151, a control section 152, and an SE 153.

The BAN communication section 151 carries out the BAN communication between the mobile terminal 100 illustrated in FIG. 10 that serves as the communication apparatus 12 or any other communication apparatus that enables the BAN communication.

The control section 152 has a built-in processor such as a CPU, for example, and executes programs stored on the SE 153 to perform control of the whole BAN device 150 including the BAN communication section 151, and other various kinds of processing.

The SE 153 stores programs to be executed by the control section 152, and necessary data. The SE 153 is configured in a manner similar to the SE 70 in FIG. 8, for example, and is able to store the data in a secure manner.

Overview of First Example of Communication Performed by Communication Apparatus 12

FIG. 12 is a diagram illustrating an overview of a first example of communication performed by the communication apparatus 12.

The mobile terminal 100 serving as the communication apparatus 12 carries out the NFC communication with the R/W serving as the communication apparatus 11 using the NFC communication section 110 to perform, as predetermined processing, data exchange for settlement with use of, for example, the electronic value stored on the SE 130.

Further, the mobile terminal 100 serving as the communication apparatus 12 carries out the BAN communication with the BAN device 150 serving as a registered device using the BAN communication section 120 to perform the personal authentication of a user using the mobile terminal 100.

The mobile terminal 100 serving as the communication apparatus 12 carries out the personal authentication of a user through the BAN communication as appropriate prior to data exchange for settlement with use of the electronic value through the NFC communication.

Thereafter, in a case of the successful personal authentication of a user through the BAN communication, the data exchange for the settlement with use of the electronic value through the NFC communication is carried out. On the contrary, in a case of the unsuccessful personal authentication of a user through the BAN communication, the data exchange for the settlement with use of the electronic value through the NFC communication is limited (is not carried out).

For example, in a case where a possessor of the mobile terminal 100 registers the BAN device 150 in the mobile terminal 100 as a registered device, and uses the mobile terminal 100 in a state of wearing the BAN device 150, the BAN device 150 serving as the registered device is detected through the BAN communication, resulting in the successful personal authentication. In such a case, the data exchange for the settlement with use of the electronic value through the NFC communication is carried out.

Therefore, if a possessor of the mobile terminal 100 wears the BAN device 150 serving as the registered device, the possessor is able to use the electronic value stored in the mobile terminal 100 (the SE 130 thereof) without performing any manipulation for the personal authentication.

Meanwhile, a third person that obtains the mobile terminal 100 without permission from a possessor thereof does not carry the BAN device 150 serving as the registered device. Thus, in a case where such a third person uses the mobile terminal 100, the BAN device 150 serving as the registered device is undetectable through the BAN communication, resulting in the unsuccessful personal authentication. In such a case, the data exchange for the settlement with use of the electronic value through the NFC communication is not carried out. As a result, this makes it possible to prevent the illegal use of the electronic value by a third person with enhanced security.

[Registration Process]

FIG. 13 is an explanatory diagram illustrating an example of a registration process of registering the BAN device 150 in the mobile terminal 100 as a registered device.

In registering the BAN device 150 in the mobile terminal 100 as a registered device, a possessor of the mobile terminal 100 carries (puts on) both of the mobile terminal 100 and the BAN device 150, and manipulates the mobile terminal 100 to perform the registration process.

In such a case, in a step S131, a BAN communication path intended for performing the BAN communication between the BAN communication section 120 of the mobile terminal 100 and the BAN communication section 151 of the BAN device 150 is assured (established) on a body of a possessor carrying the mobile terminal 100 and the BAN device 150.

Thereafter, in a step S111, the host CPU 140 of the mobile terminal 100 transmits, to the BAN communication section 120, an SE access right switchover request demanding that a right of access to the SE 130 is switched from the default NFC communication section 110 to the BAN communication section 120.

The BAN communication section 120 receives the SE access right switchover request from the host CPU 140, and assures a path for communication with the SE 130 to allow the SE 130 to perform communication only with the BAN communication section 120 in response to the SE access right switchover request.

Subsequently, mutual authentication (hereinafter also referred to as BAN mutual authentication) through the BAN communication is carried out between the mobile terminal 100 and the BAN device 150 that perform the BAN communication with each other.

In other words, in a step S112, the host CPU 140 transmits an authentication start instruction indicating start of the BAN mutual authentication to the BAN communication section 120. The BAN communication section 120 receives the authentication start instruction from the host CPU 140, and transmits the authentication start instruction to the SE 130 in a step S132.

The SE 130 receives the authentication start instruction from the BAN communication section 120.

In a case where the SE 130 receives the authentication start instruction from the BAN communication section 120, the mutual authentication through the BAN communication is carried out between the secure SE 130 of the mobile terminal 100 and the secure SE 153 of the BAN device 150 in a step S121 via the BAN communication section 120 of the mobile terminal 100 and the BAN communication section 151 of the BAN device 150.

The mutual authentication in the step S121 is carried out in a manner similar to the mutual authentication in the step S13 in FIG. 5 (the mutual authentication described in FIG. 6), for example.

Upon completion of the mutual authentication in the step S121, in a step S122, the SE 130 transmits an authentication result of the mutual authentication to the BAN communication section 120, and the BAN communication section 120 receives the authentication result from the SE 130.

In a step S133, the BAN communication section 120 transmits the authentication result from the SE 130 to the host CPU 140 as a response to the authentication start instruction given in the step S112, and the host CPU 140 receives the authentication result.

Here, as described above, a process including operation of the host CPU 140 from transmission of the authentication start instruction in the step S112 to reception of the authentication result as a response to the authentication start instruction is a process of the BAN mutual authentication.

It is to be noted that, in a case where the authentication result from the BAN communication section 120 indicates the unsuccessful mutual authentication, the host CPU 140 is able to display a message indicating the failure (a message indicating the unsuccessful mutual authentication) on an unillustrated display.

Further, in a case where the BAN device 150 includes a display, a message indicating the unsuccessful mutual authentication is transmitted from the mobile terminal 100 to the BAN device 150, and it is possible to display the message on the BAN device 150.

Meanwhile, in a case where the authentication result transmitted from the BAN communication section 120 to the host CPU 140 in the step S133 indicates the successful mutual authentication, that is, in a case where the mobile terminal 100 and the BAN device 150 are valid apparatuses, the BAN device 150 is registered in the mobile terminal 100 as a registered device by writing ID (Identification) as an authentication code to be used for the personal authentication into the mobile terminal 100 and the BAN device 150 in the following step.

Here, after completion of the successful mutual authentication between the mobile terminal 100 (the SE 130 thereof) and the BAN device 150 (the SE 153 thereof), the BAN communication between the mobile terminal 100 and the BAN device 150 is carried out in a secure manner using a session key obtained in the mutual authentication, that is, is carried out by encrypting a message.

Since encryption (decryption) of the message using the session key is carried out in the SE 130 of the mobile terminal 100 and the SE 153 of the BAN device 150, a message to be exchanged in the BAN communication between the mobile terminal 100 and the BAN device 150 after the mutual authentication is once passed to the SE 130 in the mobile terminal 100, and is once passed to the SE 153 in the BAN device 150.

In a case where the BAN device 150 is registered in the mobile terminal 100 as a registered device, a region of storing an authentication code is first created (assured) within a storage region of the SE 153 of the BAN device 150.

In other words, in a step S113, the host CPU 140 transmits, to the BAN communication section 120, a region creation instruction indicating to create (assure) the region of storing the authentication code within the storage region of the SE 153 of the BAN device 150.

The BAN communication section 120 receives the region creation instruction from the host CPU 140, and transmits (transfers) the region creation instruction to the SE 130 in a step S134.

The SE 130 receives the region creation instruction from the BAN communication section 120, and generates a region creation command demanding to create (assure) the region of storing the authentication code within the storage region of the SE 153 of the BAN device 150 in accordance with the region creation instruction.

Thereafter, in a step S123, the SE 130 transmits the region creation command to the SE 153 of the BAN device 150 through the BAN communication via the BAN communication section 120 of the mobile terminal 100 and the BAN communication section 151 of the BAN device 150.

The SE 153 receives the region creation command from the SE 130, and creates (assures) the region of storing the authentication code within the storage region of the SE 153 in accordance with the region creation command from the SE 130 in a step S151.

Subsequently, in a step S152, the SE 153 transmits a result of creation (hereinafter also referred to as a region creation result) of the region of storing the authentication code (hereinafter also referred to as an authentication code storage region) to the SE 130 of the mobile terminal 100 through the BAN communication via the BAN communication section 151 of the BAN device 150 and the BAN communication section 120 of the mobile terminal 100. Here, the region creation result includes information indicating the authentication code storage region (an address thereof).

The SE 130 receives the region creation result from the SE 153 as a response to the region creation command transmitted in the step S123, and transmits the region creation result to the BAN communication section 120 in a step S124.

The BAN communication section 120 receives the region creation result from the SE 130, and transmits the region creation result to the host CPU 140 in a step S135.

The host CPU 140 receives the region creation result from the BAN communication section 120 as a response to the region creation instruction transmitted in the step S113, and instructs writing of the authentication code in accordance with the region creation result.

In other words, in a step S114, the host CPU 140 transmits an authentication code writing instruction indicating writing of the authentication code to the BAN communication section 120, and the BAN communication section 120 receives the authentication code writing instruction from the host CPU 140.

In a step S136, the BAN communication section 120 transmits the authentication code writing instruction from the host CPU 140 to the SE 130, and the SE 130 receives the authentication code writing instruction from the BAN communication section 120.

In a step S125, the SE 130 writes an authentication code into a storage region of the SE 130 in accordance with the authentication code writing instruction from the BAN communication section 120.

Here, the SE 130 or the host CPU 140 allows for generation of the authentication code to be written by the SE 130 in the step S125.

In a case where the SE 130 generates the authentication code, the SE 130 generates the authentication code in accordance with the authentication code writing instruction from the BAN communication section 120.

Further, a storage region into which the authentication code is written in the SE 130 is created in advance within the storage region of the SE 130, as with the authentication code storage region of the SE 153.

In a case where the host CPU 140 generates the authentication code, the host CPU 140 generates the authentication code and transmits the authentication code along with the authentication code writing instruction upon transmitting an authentication code writing instruction in a step S114.

It is to be noted that generating the authentication code in the SE 130 achieves more enhanced security as compared with generating the authentication code in the host CPU 140. For example, the SE 130 allows the authentication code to be generated using information stored in a storage region accessible from the communication apparatus 11 in the storage region of the SE 130. As an alternative, it is possible to generate the authentication code using, for example, information entered by a possessor of the mobile terminal 100.

In a step S126, the SE 130 transmits, to the SE 153 of the BAN device 150, a writing command demanding to write the authentication code written in the step S125 into the BAN device 150 along with the authentication code through the BAN communication via the BAN communication section 120 of the mobile terminal 100 and the BAN communication section 151 of the BAN device 150.

The SE 153 of the BAN device 150 receives the writing command and the authentication code from the SE 130 of the mobile terminal 100. Thereafter, in a step S153, the SE 153 writes the authentication code from the SE 130 into the authentication code storage region created in the step S151 in accordance with the writing command from the SE 130.

In a step S154, the SE 153 transmits a writing result of the authentication code to the SE 130 of the mobile terminal 100 through the BAN communication via the BAN communication section 151 of the BAN device 150 and the BAN communication section 120 of the mobile terminal 100.

The SE 130 receives the writing result from the SE 153 as a response to the writing command transmitted in the step S126, and transmits the writing result from the SE 153 to the BAN communication section 120 in a step S127.

The BAN communication section 120 receives the writing result from the SE 130, and transmits the writing result to the host CPU 140 in a step S137.

The host CPU 140 receives the writing result from the BAN communication section 120 as a response to the authentication code writing instruction transmitted in the step S114.

Thereafter, in a step S115, the host CPU 140 transmits, to the BAN communication section 120, an SE access right switchover request demanding that a right of access to the SE 130 is switched from the BAN communication section 120 to the default NFC communication section 110.

The BAN communication section 120 receives the SE access right switchover request from the host CPU 140, and assures a path for communication with the SE 130 to allow the SE 130 to perform communication only with the NFC communication section 110 in response to the SE access right switchover request.

As described above, in the registration process, the BAN device 150 is registered in the mobile terminal 100 as a registered device by writing the authentication code into the SE 130 of the mobile terminal 100 and the SE 153 of the BAN device 150.

After the BAN device 150 is registered in the mobile terminal 100 as the registered device by performing the registration process, upon use of the electronic value stored in the SE 130 of the mobile terminal 100, the personal authentication that authenticates a user carrying the BAN device 150 registered in the mobile terminal 100 as the registered device as a valid possessor of the mobile terminal 100 is carried out as appropriate through the BAN communication. Thereafter, in a case of the successful personal authentication, the electronic value stored in the SE 130 of the mobile terminal 100 becomes usable.

It is to be noted that, in FIG. 13, the BAN mutual authentication is carried out between the mobile terminal 100 and the BAN device 150, and in a case of the successful BAN mutual authentication, the authentication code storage region into which the authentication code is written is created at a storage region of the SE 153 in the BAN device 150. However, it is possible to carry out creation of the authentication code storage region without the BAN mutual authentication.

Further, it is also possible to create the authentication code storage region by transmitting a specific message from the mobile terminal 100 to the BAN device 150.

In such a case, verification of the specific message is performed in the SE 153 of the BAN device 150, and the authentication code storage region is created in a case where a verification result is valid. It is possible to generate the specific message in such a manner that, in the mobile terminal 100, for example, predetermined information is encrypted using a key stored in the SE 130, and a signature is assigned to the encrypted result. Further, it is also possible to generate the specific message using a web server on the Internet, for example. In this case, the mobile terminal 100 acquires the specific message from the web server to transmit the specific message to the BAN device 150.

In addition, in FIG. 13, the authentication code is stored at secure storage regions of the SE 130 and the SE 153; however, it is possible to store the authentication code at non-secure storage regions of the mobile terminal 100 and the BAN device 150.

Further, for example, in a case where an electronic money service provider that delivers electronic money settlement services requests personal authentication through the BAN communication, after a storage region intended to deliver the settlement services is created in the SE 130, for example, it is possible to store a predetermined ID at the created storage region. In such a case, the predetermined ID is usable as the authentication code.

Moreover, for example, the electronic money service provider acquires the above-described specific message from an administration company of the SE 130 to provide the specific message to the mobile terminal 100, and allows the SE 153 of the BAN device 150 to create the authentication code storage region.

Example of Operation of R/W Serving as Communication Apparatus 11 and Mobile Terminal 100 Serving as Communication Apparatus 12

FIG. 14 is an explanatory diagram illustrating an example of operation of the R/W serving as the communication apparatus 11 and the mobile terminal 100 serving as the communication apparatus 12.

It is to be noted that hereinafter it is assumed that the BAN device 150 has been registered in the mobile terminal 100 as a registered device through the registration process in FIG. 13. Further, it is assumed that a user possessing the mobile terminal 100 carries the BAN device 150 as the registered device.

In a step S211, the communication section 21 (FIG. 2) of the R/W serving as the communication apparatus 11 repeats transmission of a polling command (a packet thereof) in a cyclic manner through the NFC communication.

In a case where the mobile terminal 100 comes close to the communication apparatus 11 in a manner of being held over the communication apparatus 11, or the like, the NFC communication section 110 (FIG. 10) of the mobile terminal 100 receives the polling command from the communication apparatus 11, and carries out routing determination to perform routing of the polling command to the SE 130 (through the communication control section 123 (FIG. 10) of the BAN communication section 120).

The SE 130 receives the polling command from the NFC communication section 110, and transmits a polling response to the polling command to the NFC communication section 110 in a step S231.

The NFC communication section 110 receives the polling response from the SE 130, and transmits, through the NFC communication, the polling response to the communication apparatus 11 that has transmitted the polling command.

The communication apparatus 11 receives the polling response from the NFC communication section 110.

In a step S212, the communication apparatus 11 (the control section 22 thereof (FIG. 2)) carries out device class determination to determine a class of an apparatus that has transmitted the polling response (hereinafter such an apparatus is also referred to as a response apparatus).

The device class determination determines a device class corresponding to a class of a response apparatus that returns a polling response to the polling command, that is, a response apparatus provided with the IC card functional capabilities. Examples of the device class include an IC card and a mobile terminal (such as a mobile phone and a smartphone).

It is to be noted that, as described in FIG. 4, a polling response includes an IDm of a response apparatus that transmits the polling response; however, it is possible to determine the device class of the response apparatus that transmits the polling response on the basis of the IDm included in the polling response.

In a case where the device class determination determines that the device class of the response apparatus is a device that is not a device having a host CPU like the host CPU 140 and a BAN communication capability (hereinafter also referred to as a personal authentication enabling device), for example, an IC card, that is, in a case where the response apparatus is, for example, the IC card 30 (FIG. 3), the communication apparatus 11 carries out mutual authentication in a step S214 to be described later without requesting personal authentication for the IC card 30 serving as the response apparatus. Thereafter, upon completion of the successful mutual authentication, in a step S215 to be described later, the communication apparatus 11 carries out data exchange with the IC card 30 serving as the response apparatus for performing the predetermined processing through the NFC communication in a manner similar to the step S14 in FIG. 5.

As described above, in a case where a response apparatus is a device such as the IC card 30 that is not a personal authentication enabling device, the communication apparatus 11 does not request personal authentication because it is not possible to carry out the personal authentication through the BAN communication.

Meanwhile, in a case where the device class determination determines that the device class of a response apparatus is a personal authentication enabling device, for example, a mobile terminal, that is, in a case where the response apparatus is, for example, the mobile terminal 100, the communication apparatus 11 transmits, through the NFC communication, a personal authentication request demanding the personal authentication of a user carrying the mobile terminal 100 to the mobile terminal 100 serving as the response apparatus in a step S213.

It is to be noted that the communication apparatus 11 is able to request the personal authentication in a case where the response apparatus is the personal authentication enabling device, and the prescribed conditions are satisfied.

In other words, the prescribed conditions include, for example, conditions where the amount of electronic money to be subjected to settlement is not less than the predetermined amount, and a specific electronic ticket is used, and the like, and the communication apparatus 11 is able to request the personal authentication in a case where a response apparatus is the personal authentication enabling device, and the prescribed conditions are satisfied.

In such a case, in a case where the amount of electronic money to be subjected to settlement is not less than the predetermined amount, or a specific electronic ticket is used, it is possible to carry out the personal authentication. In other words, in a case where high-amount settlement is made, or a paid electronic ticket is used, it is possible to carry out the personal authentication. This makes it possible to prevent high-amount settlement or the use of a paid electronic ticket with illegal use of the mobile terminal 100 by a third person.

In a case where the specification demanding the personal authentication are adopted under conditions where the response apparatus is the personal authentication enabling device and the prescribed conditions are satisfied, if the response apparatus is the personal authentication enabling device, but the prescribed conditions are not satisfied, the communication apparatus 11 does not request the personal authentication, and is able to carry out mutual authentication in a step S214 to be described later, and data exchange for the predetermined processing through the NFC communication in a step S215 to be described later.

In such a case, in a case where the amount of electronic money to be subjected to settlement is not the predetermined amount or more, or an electronic ticket other than the specific electronic ticket is used, the data exchange for the predetermined processing through the NFC communication in the step S215 is performed without the personal authentication. In this case, for low-amount settlement, or the use of a charge-free electronic ticket, any user is able to perform such an action using the mobile terminal 100.

It is possible to preliminarily set the prescribed conditions demanding the personal authentication in the communication apparatus 11.

Further, as the prescribed conditions demanding the personal authentication, it is possible to adopt, for example, a condition where predetermined data representing the necessity for the personal authentication is stored in the mobile terminal 100 (for example, the SE 130, etc. thereof), or the like, in addition to the conditions where the amount of electronic money to be subjected to settlement is not less than the predetermined amount, or a specific electronic ticket is used.

The NFC communication section 110 of the mobile terminal 100 receives the personal authentication request that the communication apparatus 11 transmits in the step S213, and carries out routing determination to perform routing of the personal authentication request to the host CPU 140.

The host CPU 140 receives the personal authentication request from the NFC communication section 110. Thereafter, in a step S241, the host CPU 140 transmits a stop request demanding stop of the NFC communication to the NFC communication section 110 in response to the personal authentication request from the NFC communication section 110.

The NFC communication section 110 receives the stop request from the host CPU 140, and stops the NFC communication in response to the stop request.

Here, in the mobile terminal 100, the personal authentication requested by the communication apparatus 11 is carried out in such a manner that the BAN communication section 120 gains access to the SE 130 to use an authentication code written into the SE 130.

Meanwhile, in the NFC communication section 110, in a case where the mobile terminal 100 has come close to an access area of the communication apparatus 11, the NFC communication section 110 may attempt to gain access to the SE 130 depending on circumstances in response to various commands transmitted from the communication apparatus 11.

In a case where the BAN communication section 120 gains access to the SE 130 to perform the personal authentication through the BAN communication, if the NFC communication section 110 gains access to the SE 130, malfunction of the mobile terminal 100 may occur. For protection of such a malfunction, the NFC communication performed by the NFC communication section 110 is stopped while the personal authentication through the BAN communication is being carried out.

It is to be noted that it is also possible to carry out the personal authentication through the BAN communication without stopping the NFC communication performed by the NFC communication section 110.

In a step S242, the host CPU 140 transmits, to the BAN communication section 120, an SE access right switchover request demanding that a right of access to the SE 130 is switched from the default NFC communication section 110 to the BAN communication section 120.

The BAN communication section 120 receives the SE access right switchover request from the host CPU 140, and assures a path for communication with the SE 130 to allow the SE 130 to perform communication only with the BAN communication section 120 in response to the SE access right switchover request.

In a step S243, the host CPU 140 transmits a BAN device retrieval instruction indicating retrieval of a BAN device to the BAN communication section 120, and the BAN communication section 120 receives the BAN device retrieval instruction from the host CPU 140.

In a step S251, the BAN communication section 120 follows the BAN device retrieval instruction from the host CPU 140 to transmit search commands for retrieval of the BAN device repeatedly (intermittently) through the BAN communication.

In a case where a possessor of the mobile terminal 100 carries a BAN device such as the BAN device 150 that enables the BAN communication, that is, for example, the BAN device 150, a BAN communication path intended for performing the BAN communication is assured on a body of the possessor carrying the mobile terminal 100 and the BAN device 150. In such a case, the BAN device 150 is able to receive the search command transmitted by the BAN communication section 120 of the mobile terminal 100.

The BAN device 150 that receives the search command transmits a response to the search command from the BAN communication section 120 to the BAN communication section 120 in a step S261. The BAN communication section 120 receives the response to the search command from the BAN device 150 to transmit the response to the host CPU 140.

The host CPU 140 receives the response to the search command from the BAN communication section 120 as a response to the BAN device retrieval instruction transmitted in the step S243.

Here, in a case where a possessor of the mobile terminal 100 carries no BAN device such as the BAN device 150, a response to the search command transmitted by the BAN communication section 120 is not returned.

For example, in a case where a response to the search command is not returned even after the elapse of a specified period of time from the start of transmission of the search command in the step S251, the BAN communication section 120 returns a response indicating time-out to the host CPU 140.

In a case where a response from the BAN communication section 120 indicates time-out, that is, for example, in a case where a user carrying the mobile terminal 100 is a user who obtains the mobile terminal 100 in an illegal manner, and therefore carries no BAN device 150 serving as a registered device, resulting in the time-out, or in a case where a user carrying the mobile terminal 100 is a possessor of the mobile terminal 100, but carries no BAN device 150 serving as a registered device, resulting in the time-out, the host CPU 140 is able to avoid performing the subsequent processes.

In such a case, it is possible to prevent a third person who illegally obtains the mobile terminal 100 from illegally using the electronic value stored in the mobile terminal 100.

It is to be noted that, if the subsequent processes are not carried out in the event of the time-out, in a case where a user carrying the mobile terminal 100 is a possessor of the mobile terminal 100, but carries no BAN device 150 serving as a registered device, resulting in the time-out, the possessor of the mobile terminal 100 is unable to use the electronic value stored in the mobile terminal 100.

Accordingly, in the event of the time-out, it is possible to carry out the personal authentication in another method that is performed in the event of failure of the personal authentication in a step S247 to be described later instead of the personal authentication through the BAN communication. Thereafter, in a case of success in the personal authentication in such another method, this makes it possible to carry out mutual authentication in a step S214 to be described later, and data exchange for predetermined processing through the NFC communication in a step S215 to be described later.

In this case, if the personal authentication in such another method is successful, a possessor of the mobile terminal 100 is able to use the electronic value stored in the mobile terminal 100.

In a case where the host CPU 140 receives a response to the search command to be transmitted by the BAN device 150 in a step S261 through the BAN communication section 120, the personal authentication through the BAN communication is carried out between the mobile terminal 100 and the BAN device 150.

In other words, in a step S244, the host CPU 140 transmits a personal authentication instruction indicating the personal authentication to the BAN communication section 120, and the BAN communication section 120 receives the personal authentication instruction from the host CPU 140.

In a step S252, the BAN communication section 120 transmits the personal authentication instruction from the host CPU 140 to the SE 130, and the SE 130 receives the personal authentication instruction from the BAN communication section 120.

In a step S232, in response to the personal authentication instruction from the BAN communication section 120, the SE 130 transmits a readout command demanding readout of an authentication code to the BAN device 150 through the BAN communication via the BAN communication section 120. The BAN device 150 receives the readout command transmitted from the SE 130 via the BAN communication section 120.

In a step S262, in response to the readout command from the SE 130, the BAN device 150 reads the authentication code written into the SE 153 in the registration process in FIG. 13, and transmits such an authentication code to the BAN communication section 120 of the mobile terminal 100 through the BAN communication.

The BAN communication section 120 receives the authentication code from the BAN device 150, and transmits the authentication code to the SE 130 in a step S253.

The SE 130 receives the authentication code of the BAN device 150 transmitted from the BAN communication section 120, and carries out authentication with use of the authentication code as the personal authentication of a user carrying the mobile terminal 100 in a step S233.

In other words, the SE 130 determines whether the authentication code of the BAN device 150 and the authentication code written into the SE 130 are matched as the authentication with use of the authentication code of the BAN device 150.

If the registration process in FIG. 13 that registers the BAN device 150 in the mobile terminal 100 as a registered device has been already completed, the authentication code of the BAN device 150 and the authentication code written into the SE 130 are matched, resulting in success of the personal authentication.

On the contrary, in a case where the registration process in which the BAN device 150 is registered in the mobile terminal 100 as a registered device has not been completed, that is, for example, in a case where the BAN device 150 has been registered in a mobile terminal other than the mobile terminal 100, but has not been registered in the mobile terminal 100, the authentication code of the BAN device 150 and the authentication code written into the SE 130 are mismatched, resulting in failure of the personal authentication.

In such a manner, the SE 130 carries out the authentication with use of the authentication code received through the BAN communication as the personal authentication of a user carrying the mobile terminal 100, and therefore is able to function as an authentication section that performs the personal authentication of the user through the BAN communication.

It is to be noted that, in a case where a plurality of BAN devices respond to the search command in the step S251, an authentication code is read out from each of the plurality of BAN devices, and the authentication with use of such authentication codes is carried out. In such a case, in a case where the authentication codes of one or more of the plurality of BAN devices match the authentication code written into the SE 130, it is determined that the personal authentication is successful.

Further, in a case where BAN devices (one or more BAN devices) respond to the search command in the step S251, but it is not possible to read out authentication codes from all of the responding BAN devices, that is, in a case where authentication codes are not written in the BAN devices responding to the search command, or in a case where the BAN devices responding to the search command are not devices corresponding to the personal authentication through the BAN communication, it is determined that the personal authentication is unsuccessful.

In a step S234, the SE 130 transmits, to the BAN communication section 120, an authentication result of the authentication with use of the authentication code of the BAN device 150, that is, a result of determination concerning whether the authentication code of the BAN device 150 and the authentication code written into the SE 130 are matched as an authentication result of the personal authentication through the BAN communication.

Here, it is possible to include the authentication code of the BAN device 150 in the authentication result of the authentication with use of the authentication code of the BAN device 150 (the authentication result of the personal authentication through the BAN communication).

The BAN communication section 120 receives the authentication result from the SE 130, and transmits the authentication result to the host CPU 140 in a step S254. The host CPU 140 receives the authentication result from the BAN communication section 120 as a response to the personal authentication instruction transmitted in the step S244.

Here, as described above, a process including operation of the host CPU 140 from transmission of the personal authentication instruction in the step S244 to reception of the authentication result transmitted as a response to the personal authentication instruction is a process of the personal authentication through the BAN communication.

Upon reception of the authentication result of the personal authentication through the BAN communication from the BAN communication section 120, in a step S245, the host CPU 140 transmits, to the BAN communication section 120, an SE access right switchover request demanding that a right of access to the SE 130 is switched from the BAN communication section 120 to the default NFC communication section 110.

The BAN communication section 120 receives the SE access right switchover request from the host CPU 140, and assures a path for communication with the SE 130 to allow the SE 130 to perform communication only with the NFC communication section 110 in response to the SE access right switchover request.

In a step S246, the host CPU 140 transmits a restart request demanding restart of the NFC communication that is stopped in the step S241 to the NFC communication section 110.

The NFC communication section 110 receives the restart request from the host CPU 140, and restarts the NFC communication in response to the restart request.

Thereafter, in a step S247, the host CPU 140 transmits the authentication result received from the BAN communication section 120 to the communication apparatus 11 as the authentication result of the personal authentication through the NFC communication via the NFC communication section 110.

Here, in a case where the authentication result that the host CPU 140 receives from the BAN communication section 120 indicates failure of the authentication, or timeout as described previously, the host CPU 140 is able to execute the personal authentication in an alternative method instead of the personal authentication through the BAN communication in a step S247.

As the personal authentication in the alternative method, it is possible to employ authentication that asks for a user carrying the mobile terminal 100 to enter a password or a fingerprint to use such a password or a fingerprint for the personal authentication.

In a case where the authentication with use of a password or a fingerprint is performed as the personal authentication in the alternative method, it is necessary for a possessor of the mobile terminal 100 to preliminarily register a password or a fingerprint in the mobile terminal 100.

In a case where the personal authentication in the alternative method is successful, the host CPU 140 is able to transmit a message indicating success of the personal authentication in the alternative method as the authentication result of the personal authentication to the communication apparatus 11 in a step S247 instead of the authentication result received from the BAN communication section 120.

The communication apparatus 11 receives the authentication result transmitted from the host CPU 140 through the NFC communication.

Thereafter, in a case where the authentication result represents failure of the personal authentication, the subsequent processes are not carried out.

Meanwhile, in a case where the authentication result represents success of the personal authentication, the communication section 21 (FIG. 2) of the communication apparatus 11 designates the IDm included in a polling response from the mobile terminal 100 to request mutual authentication in a step S214. Thus, the communication apparatus 11 carries out the mutual authentication similar to the step S13 in FIG. 5 between the mobile terminal 100 designated by the IDm.

After the mutual authentication in the step S214 is successful, data exchange for predetermined processing (for example, electronic money settlement) through the NFC communication is carried out between the communication apparatus 11 and the mobile terminal 100 in a step S215 in a manner similar to the step S14 in FIG. 5.

As described above, the communication apparatus 11 transmits a request of personal authentication of a user carrying the mobile terminal 100 prior to the data exchange for the predetermined processing through the NFC communication with the mobile terminal 100 serving as a communication peer of the communication apparatus 11. In a case where the personal authentication through the BAN communication with use of the BAN device 150 is successful in the mobile terminal 100, the communication apparatus 11 carries out the data exchange for the predetermined processing through the NFC communication with the mobile terminal 100.

Meanwhile, the mobile terminal 100 performs personal authentication of a user carrying the mobile terminal 100 through the BAN communication with use of the BAN device 150 in response to the request from the communication apparatus 11 serving as a communication peer of the mobile terminal 100 prior to the data exchange for the predetermined processing through the NFC communication with the communication apparatus 11. In a case of the successful personal authentication, the mobile terminal 100 carries out the data exchange for the predetermined processing through the NFC communication with the communication apparatus 11.

Therefore, this makes it possible to prevent a third person carrying no BAN device 150 from illegally using the electronic value stored in the mobile terminal 100.

Further, in a case where the personal authentication through the BAN communication with use of the BAN device 150 is unsuccessful, but the personal authentication in an alternative method is successful, the data exchange for the predetermined processing through the NFC communication is carried out between the communication apparatus 11 and the mobile terminal 100.

In such a case, for example, it is possible to prevent a possessor of the mobile terminal 100 who forgets to carry the BAN device 150 from being unable to use the electronic value stored in the mobile terminal 100.

It is to be noted that, in a case where the communication apparatus 11 is able to recognize an authentication code written into the BAN device 150 in some method or other, that is, for example, in a case where the mobile terminal 100 receives offering of an authentication code from a service provider delivering settlement services, etc. with use of the communication apparatus 11 in the registration process in FIG. 13, and such an authentication code is written into the BAN device 150, it is possible to include the authentication code of the BAN device 150 that is read from the BAN device 150 in an authentication result to be transmitted from the host CPU 140 to the communication apparatus 11 in a step S247.

In such a case, the communication apparatus 11 is able to recognize success or failure of the personal authentication through the BAN communication depending on whether the authentication code of the BAN device 150 included in the authentication result transmitted from the host CPU 140 matches the authentication code provided from a service provider.

FIG. 15 is an explanatory diagram illustrating another example of operation of the R/W serving as the communication apparatus 11 and the mobile terminal 100 serving as the communication apparatus 12.

In FIG. 15, the processing is carried out in a more secure manner as compared with the case of FIG. 14.

It is to be noted that in FIG. 15, it is assumed that the process in which the R/W serving as the communication apparatus 11 repeats transmission of the polling command in a cyclic manner in the step S211 in FIG. 4; the process in which the SE 130 of the mobile terminal 100 transmits a polling response to the polling from the communication apparatus 11 to the communication apparatus 11 through the NFC communication by the NFC communication section 110 in the step S231; and the process of the device class determination in which the communication apparatus 11 determines a class of the mobile terminal 100 serving as a responding apparatus transmitting a polling response in the step S212 have been already carried out.

Further, for the device class determination, it is assumed that a device class of the mobile terminal 100 serving as the responding apparatus is determined to be a mobile terminal that is a personal authentication enabling device.

In such a case, in a step S311, the communication apparatus 11 transmits a personal authentication request demanding the personal authentication of a user carrying the mobile terminal 100 to the mobile terminal 100 serving as the responding apparatus through the NFC communication, in a manner similar to the step S213 in FIG. 14.

Here, also in FIG. 15 as with the case of FIG. 14, the communication apparatus 11 is able to request the personal authentication in a case where the responding apparatus is a personal authentication enabling device, and the prescribed conditions are satisfied.

The NFC communication section 110 of the mobile terminal 100 receives the personal authentication request transmitted by the communication apparatus 11 in the step S311, and carries out routing determination to perform routing of the personal authentication request to the host CPU 140.

The host CPU 140 receives the personal authentication request from the NFC communication section 110. Thereafter, in a step S341, the host CPU 140 transmits a stop request demanding stop of the NFC communication to the NFC communication section 110 in response to the personal authentication request from the NFC communication section 110, in a manner similar to the step S241 in FIG. 14.

The NFC communication section 110 receives the stop request from the host CPU 140, and stops the NFC communication in response to the stop request.

In a step S342, the host CPU 140 transmits, to the BAN communication section 120, an SE access right switchover request demanding that a right of access to the SE 130 is switched from the default NFC communication section 110 to the BAN communication section 120, in a manner similar to the step S242 in FIG. 14.

The BAN communication section 120 receives the SE access right switchover request from the host CPU 140, and assures a path for communication with the SE 130 to allow the SE 130 to perform communication only with the BAN communication section 120 in response to the SE access right switchover request.

In a step S343, the host CPU 140 transmits a BAN device retrieval instruction indicating retrieval of a BAN device to the BAN communication section 120 in a manner similar to the step S243 in FIG. 14, and the BAN communication section 120 receives the BAN device retrieval instruction from the host CPU 140.

In a step S351, the BAN communication section 120 transmits search commands for retrieval of the BAN device repeatedly through the BAN communication in accordance with the BAN device retrieval instruction from the host CPU 140, in a manner similar to the step S251 in FIG. 14.

As described in FIG. 14, in a case where a possessor of the mobile terminal 100 carries, for example, the BAN device 150 that enables the BAN communication, a BAN communication path intended for performing the BAN communication is assured on a body of the possessor carrying the mobile terminal 100 and the BAN device 150. Thereafter, the BAN device 150 receives the search command transmitted from the BAN communication section 120 of the mobile terminal 100.

In a step S361, the BAN device 150 having received the search command transmits a response to the search command from the BAN communication section 120 to the BAN communication section 120, in a manner similar to the step S261 in FIG. 14. The BAN communication section 120 receives the response to the search command from the BAN device 150, and transmits such a response to the host CPU 140.

The host CPU 140 receives the response to the search command from the BAN communication section 120 as a response to the BAN device retrieval instruction transmitted in the step S343.

Here, in a case where the possessor of the mobile terminal 100 carries no BAN device such as the BAN device 150, a response to the search command transmitted from the BAN communication section 120 is not returned. In such a case, this results in time-out as with the case of FIG. 14.

In a case where the host CPU 140 receives, through the BAN communication section 120, the response to the search command transmitted from the BAN device 150 in the step S361, the BAN mutual authentication similar to that in the step S121, etc. in FIG. 13 is carried out between the mobile terminal 100 (the SE 130 thereof) and the BAN device 150 (the SE 153 thereof) in a step S331.

In a case of failure of the BAN mutual authentication in the step S331, the subsequent processes are not carried out.

Further, in a case of success of the BAN mutual authentication in the step S331, the subsequent BAN communication between the mobile terminal 100 and the BAN device 150 is performed in a secure manner using a session key obtained by the BAN mutual authentication, that is, by encrypting a message.

In a case where the BAN mutual authentication in the step S331 is successful, the personal authentication through the BAN communication as with the case of FIG. 14 is carried out between the mobile terminal 100 and the BAN device 150 in a step S332.

In other words, in the personal authentication through the BAN communication, it is determined whether the authentication code written into the BAN device 150 and the authentication code written into the SE 130 are matched.

As described in FIG. 14, an authentication result of the personal authentication through the BAN communication is transmitted to the host CPU 140 from the SE 130 of the mobile terminal 100 through the BAN communication section 120 in the form of including the authentication code of the BAN device 150 as appropriate, and is received by the host CPU 140.

Upon reception of the authentication result of the personal authentication through the BAN communication from the BAN communication section 120, in a step S344, the host CPU 140 transmits, to the BAN communication section 120, an SE access right switchover request demanding that a right of access to the SE 130 is switched from the BAN communication section 120 to the default NFC communication section 110, in a manner similar to the step S245 in FIG. 14.

The BAN communication section 120 receives the SE access right switchover request from the host CPU 140, and assures a path for communication with the SE 130 to allow the SE 130 to perform communication only with the NFC communication section 110 in response to the SE access right switchover request.

In a step S345, the host CPU 140 transmits a restart request demanding restart of the NFC communication that is stopped in the step S341 to the NFC communication section 110.

The NFC communication section 110 receives the restart request from the host CPU 140, and restarts the NFC communication in response to the restart request.

In a case where the NFC communication section 110 restarts the NFC communication to allow for the NFC communication with the communication apparatus 11, the mutual authentication similar to that in the step S13 in FIG. 5 is carried out between the communication apparatus 11 and the SE 130 of the mobile terminal 100 through the NFC communication via the NFC communication section 110 in a step S312.

In a case of failure of the mutual authentication in the step S312, the subsequent processes are not carried out.

Further, in a case of success of the mutual authentication in the step S312, in a step S346, the host CPU 140 transmits the authentication result received from the BAN communication section 120 to the communication apparatus 11 as the authentication result of the personal authentication through the NFC communication via the NFC communication section 110.

Here, in a case where the authentication result of the personal authentication through the BAN communication that is received by the host CPU 140 represents failure of the authentication, or time-out as described previously, the host CPU 140 is able to execute the personal authentication in an alternative method instead of the personal authentication through the BAN communication, as described in FIG. 14.

Thereafter, in a case where the personal authentication in the alternative method is successful, in the step S346, the host CPU 140 is able to transmit a message indicating success of the personal authentication in the alternative method as the authentication result of the personal authentication to the communication apparatus 11 instead of the authentication result received from the BAN communication section 120.

In FIG. 15, as described above, in a case where the host CPU 140 transmits the authentication result of the personal authentication to the communication apparatus 11 through the NFC communication, the mutual authentication in the step S312 has been already successful. Therefore, the authentication result of the personal authentication that the host CPU 140 transmits to the communication apparatus 11 through the NFC communication is transmitted in a secure manner using a session key obtained by the mutual authentication in the step S312, that is, in the form of being encrypted.

In other words, in the step S346, the host CPU 140 transmits the authentication result of the personal authentication to the NFC communication section 110, and the NFC communication section 110 receives the authentication result from the host CPU 140.

In a step S321, the NFC communication section 110 transmits the authentication result from the host CPU 140 to the SE 130, and the SE 130 receives the authentication result from the NFC communication section 110 to encrypt the authentication result using the session key obtained by the mutual authentication in the step S312.

Thereafter, in a step S333, the SE 130 transmits the (encrypted) authentication result to the communication apparatus 11 through the NFC communication via the NFC communication section 110.

The communication apparatus 11 receives the authentication result of the personal authentication that is transmitted from the NFC communication section 110 through the NFC communication. The authentication result of the personal authentication that the communication apparatus 11 receives from the NFC communication section 110 is encrypted as described above; however, the communication apparatus 11 allows a cipher of the authentication result to be decrypted using the session key obtained by the mutual authentication in the step S312.

In a case where the authentication result of the personal authentication that the communication apparatus 11 receives from the NFC communication section 110 represents failure of the personal authentication, the subsequent processes are not carried out.

Meanwhile, in a case where the authentication result of the personal authentication represents success of the personal authentication, data exchange for predetermined processing through the NFC communication that is similar to that in the step S14 in FIG. 5 is carried out between the communication apparatus 11 and the mobile terminal 100 in a step S313.

As described above, in FIG. 15, the personal authentication through the BAN communication is carried out after the BAN mutual authentication in the step S331. Further, the authentication result of the personal authentication is transmitted after the mutual authentication in the step S312. Therefore, in FIG. 15, it is possible to carry out the processing in a more secure manner as compared with the case of FIG. 14.

Example of Operation of Service Serving as Communication Apparatus 11 and Mobile Terminal 100 Serving as Communication Apparatus 12

FIG. 16 is an explanatory diagram illustrating an example of operation of a service serving as the communication apparatus 11 and the mobile terminal 100 serving as the communication apparatus 12.

In other words, in FIGS. 14 and 15, the R/W that performs the NFC communication with the mobile terminal (the NFC communication section 110 thereof) is employed as the communication apparatus 11; however, a service to be provided by web servers, etc. on the Internet is employed as the communication apparatus 11 in FIG. 16.

Therefore, in FIG. 16, communication between the service serving as the communication apparatus 11 and the mobile terminal 100 serving as the communication apparatus 12 is carried out between the communication apparatus 11 and the host CPU 140 of the mobile terminal 100 over the Internet, as indicated with an arrowed dotted line in FIG. 16.

In a step S411, the communication section 21 (FIG. 2) of the service serving as the communication apparatus 11 transmits a polling command (a packet thereof) to the mobile terminal 100 over the Internet.

The host CPU 140 of the mobile terminal 100 receives the polling command from the communication apparatus 11, and transmits the polling command to the NFC communication section 110 in a step S441.

The NFC communication section 110 receives the polling command from the host CPU 140, and carries out routing determination in a step S421 to perform routing of the polling command to the SE 130 (through the communication control section 123 (FIG. 10) of the BAN communication section 120).

The SE 130 receives the polling command from the NFC communication section 110, and transmits a polling response to the polling command to the NFC communication section 110 in a step S431.

The NFC communication section 110 receives the polling response from the SE 130, and transmits the polling response to the host CPU 140 that has transmitted the polling command in a step S422.

The host CPU 140 receives the polling response from the NFC communication section 110, and transmits the polling response to the communication apparatus 11 that has transmitted the polling command over the Internet in a step S442.

The communication apparatus 11 receives the polling response from the host CPU 140.

In a step S412, the communication apparatus 11 (the control section 22 thereof (FIG. 2)) carries out device class determination that determines a class of a responding apparatus that is as an apparatus that has transmitted the polling response, in a manner similar to the step S212 in FIG. 14.

In the device class determination, in a case where it is determined that the device class of the responding apparatus is a device that is not a personal authentication enabling device, the communication apparatus 11 does not perform the subsequent processes, or performs mutual authentication in a step S414 to be described later without requesting the personal authentication to the responding apparatus. After success of the personal authentication, the communication apparatus 11 carries out data exchange for predetermined processing with the responding apparatus in a step S415 to be described later.

Meanwhile, in the device class determination, in a case where it is determined that the device class of the responding apparatus is a personal authentication enabling device, that is, for example, the responding apparatus is the mobile terminal 100, the communication apparatus 11 transmits, in a step S413, a personal authentication request demanding the personal authentication of a user carrying the mobile terminal 100 to the mobile terminal 100 serving as the responding apparatus over the Internet.

It is to be noted that, as with the case of FIG. 14, the communication apparatus 11 is able to request the personal authentication in a case where the responding apparatus is a personal authentication enabling device, and the prescribed conditions are satisfied.

The host CPU 140 of the mobile terminal 100 receives the personal authentication request that the communication apparatus 11 transmits in the step S413, and transmits, in a step S443, a stop request demanding stop of the NFC communication to the NFC communication section 110 in response to the personal authentication request, in a manner similar to the step S241 in FIG. 14.

The NFC communication section 110 receives the stop request from the host CPU 140, and stops the NFC communication in response to the stop request.

Thereafter, in a step S444, the host CPU 140 transmits, to the BAN communication section 120, an SE access right switchover request demanding that a right of access to the SE 130 is switched from the default NFC communication section 110 to the BAN communication section 120, in a manner similar to the step S242 in FIG. 14.

The BAN communication section 120 receives the SE access right switchover request from the host CPU 140, and assures a path for communication with the SE 130 to allow the SE 130 to perform communication only with the BAN communication section 120 in response to the SE access right switchover request.

In a step S445, the host CPU 140 transmits a BAN device retrieval instruction indicating retrieval of a BAN device to the BAN communication section 120 in a manner similar to the step S243 in FIG. 14, and the BAN communication section 120 receives the BAN device retrieval instruction from the host CPU 140.

In a step S451, the BAN communication section 120 transmits search commands for retrieval of the BAN device repeatedly through the BAN communication in accordance with the BAN device retrieval instruction from the host CPU 140, in a manner similar to the step S251 in FIG. 14.

In a case where a possessor of the mobile terminal 100 carries a BAN device such as the BAN device 150 that enables the BAN communication, a BAN communication path intended for performing the BAN communication is assured on a body of the possessor carrying the mobile terminal 100 and the BAN device 150. In such a case, the BAN device 150 receives the search command transmitted from the BAN communication section 120 of the mobile terminal 100.

In a step S461, the BAN device 150 transmits a response to the search command from the BAN communication section 120 to the BAN communication section 120. The BAN communication section 120 receives the response to the search command from the BAN device 150, and transmits such a response to the host CPU 140.

The host CPU 140 receives the response to the search command from the BAN communication section 120 as a response to the BAN device retrieval instruction transmitted in the step S445.

Here, in a case where a possessor of the mobile terminal 100 carries no BAN device such as the BAN device 150, a response to the search command transmitted by the BAN communication section 120 is not returned. In such a case, this results in time-out as with the case of FIG. 14.

In a case where the host CPU 140 receives the response to the search command, the personal authentication through the BAN communication as with the case of FIG. 14 is carried out between the mobile terminal 100 and the BAN device 150 in a step S432.

As described in FIG. 14, an authentication result of the personal authentication through the BAN communication is transmitted to the host CPU 140 from the SE 130 of the mobile terminal 100 through the BAN communication section 120 in the form of including the authentication code of the BAN device 150 as appropriate, and is received by the host CPU 140.

Upon reception of the authentication result of the personal authentication through the BAN communication from the BAN communication section 120, in a step S446, the host CPU 140 transmits, to the BAN communication section 120, an SE access right switchover request demanding that a right of access to the SE 130 is switched from the BAN communication section 120 to the default NFC communication section 110, in a manner similar to the step S245 in FIG. 14.

The BAN communication section 120 receives the SE access right switchover request from the host CPU 140, and assures a path for communication with the SE 130 to allow the SE 130 to perform communication only with the NFC communication section 110 in response to the SE access right switchover request.

In a step S447, the host CPU 140 transmits a restart request demanding restart of the NFC communication that is stopped in the step S443 to the NFC communication section 110.

The NFC communication section 110 receives the restart request from the host CPU 140, and restarts the NFC communication in response to the restart request.

Thereafter, in a step S448, the host CPU 140 transmits the authentication result of the personal authentication to the communication apparatus 11 over the Internet.

Here, in a case where the authentication result of the personal authentication through the BAN communication that is received by the host CPU 140 represents failure of the authentication, or time-out as described previously, the host CPU 140 is able to execute the personal authentication in an alternative method instead of the personal authentication through the BAN communication, as described in FIG. 14.

Thereafter, in a case where the personal authentication in the alternative method is successful, in the step S448, the host CPU 140 is able to transmit a message indicating success of the personal authentication in the alternative method as the authentication result of the personal authentication to the communication apparatus 11 instead of the authentication result of the personal authentication through the BAN communication.

The communication apparatus 11 receives the authentication result transmitted from the host CPU 140 over the Internet.

In a case where the authentication result of the personal authentication represents failure of the personal authentication, the subsequent processes are not carried out.

Meanwhile, in a case where the authentication result represents success of the personal authentication, the communication section 21 (FIG. 2) of the communication apparatus 11 performs, in a step S414, mutual authentication similar to that in the step S113 in FIG. 5 with the SE 130 over the Internet, and further through the host CPU 140 and the NFC communication section 110.

Thereafter, after success of the mutual authentication in the step S414, in a step S415, data exchange for predetermined processing that is similar to that in the step S14 in FIG. 5 is carried out between the communication apparatus 11 and the SE 130 of the mobile terminal 100 over the Internet, and further through the host CPU 140 and the NFC communication section 110.

As described above, even if communication over the Internet instead of the NFC communication is carried out between the communication apparatuses 11 and 12, the communication apparatus 11 transmits a request of the personal authentication of a user carrying the communication apparatus 12 prior to the data exchange for the predetermined processing, and the communication apparatus 12 performs the personal authentication of a user carrying the mobile terminal 100 through the BAN communication with use of the BAN device 150 in response to the request from the communication apparatus 11. This makes it possible to prevent a third person carrying no BAN device 150 from illegally using electronic value stored in the mobile terminal 100 serving as the communication apparatus 12.

It is to be noted that, as seen from FIG. 16, even in a case where communication between the service serving as the communication apparatus 11 and the mobile terminal 100 serving as the communication apparatus 12 is carried out between the communication apparatus 11 and the host CPU 140 of the mobile terminal 100 over the Internet, the mutual authentication is carried out between the communication apparatus 11 and the mobile terminal 100 before the BAN mutual authentication is carried out between the mobile terminal 100 and the BAN device 150, and an authentication result of the personal authentication is transmitted from the mobile terminal 100 to the communication apparatus 11, as with the case of FIG. 15. This allows the processing to be performed in a more secure manner.

Overview of Second Example of Communication Performed by Communication Apparatus 12

FIG. 17 is a diagram illustrating an overview of a second example of communication performed by the communication apparatus 12.

In the above-described case, as described in FIG. 12, the NFC communication and the BAN communication are used in a coexistent form by performing the data exchange intended for making settlement with use of electronic value through the NFC communication and performing the personal authentication of a user through the BAN communication. However, it is possible to carry out both of the data exchange intended for making settlement with use of the electronic value and the personal authentication of a user through the BAN communication.

The mobile terminal 100 serving as the communication apparatus 12 carries out the BAN communication with the communication apparatus 11 by the BAN communication section 120, and performs the data exchange for settlement with use of, for example, the electronic value stored on the SE 130.

Further, the mobile terminal 100 serving as the communication apparatus 12 carries out the BAN communication with the BAN device 150 serving as a registered device by the BAN communication section 120, and performs the personal authentication of a user using the mobile terminal 100 through such BAN communication.

The mobile terminal 100 serving as the communication apparatus 12 is able to carry out the personal authentication of a user through the BAN communication as appropriate prior to the data exchange for settlement with use of the electronic value through the BAN communication.

Thereafter, in a case of the successful personal authentication of a user through the BAN communication, the data exchange for the settlement with use of the electronic value through the BAN communication is carried out. On the contrary, in a case of the unsuccessful personal authentication of a user through the BAN communication, the data exchange for the settlement with use of the electronic value through the BAN communication is limited (is not carried out).

For example, in a case where a possessor of the mobile terminal 100 registers the BAN device 150 in the mobile terminal 100 as a registered device, and uses the mobile terminal 100 in a state of wearing the BAN device 150, the BAN device 150 serving as the registered device is detected through the BAN communication, resulting in the successful personal authentication. In such a case, the data exchange for the settlement with use of the electronic value through the BAN communication is carried out.

Therefore, if a possessor of the mobile terminal 100 wears the BAN device 150 serving as the registered device, the possessor is able to use the electronic value stored in the mobile terminal 100 (the SE 130 thereof) without performing any manipulation for the personal authentication.

Meanwhile, a third person that obtains the mobile terminal 100 without permission from a possessor thereof carries no BAN device 150 serving as the registered device. Thus, in a case where such a third person uses the mobile terminal 100, the BAN device 150 serving as the registered device is undetectable through the BAN communication, resulting in the unsuccessful personal authentication. In such a case, the data exchange for the settlement with use of the electronic value through the BAN communication is not carried out. As a result, this makes it possible to prevent the illegal use of the electronic value by a third person.

It is to be noted that, according to the technology, in order to make the settlement with use of the electronic value, even if the data exchange for the settlement with use of the electronic value is performed through any of the NFC communication and the BAN communication, it is necessary for a user to carry both of the mobile terminal 100 and the BAN device 150 (registered in the mobile terminal 100).

Meanwhile, a third person has difficulty in obtaining both of the mobile terminal 100 and the BAN device 150 of another user. In other words, there is a possibility to some extent that a possessor of the mobile terminal 100 and the BAN device 150 loses only either the mobile terminal 100 or the BAN device 150, but a possibility that the possessor loses both of the mobile terminal 100 and the BAN device 150 is extremely low. Therefore, a possibility that a third person is able to obtain both of the mobile terminal 100 and the BAN device 150 is extremely low.

Here, on the assumption that the mobile terminal 100 and the BAN device 150 are stolen together, it is possible to further add the security. For example, in a wearable device such as a watch or a band, use of a (capacitance) sensor makes it possible to detect whether such a wearable device is worn on a human body. Therefore, in a case where such a wearable device is employed as the BAN device 150, it is detected that a user puts on the BAN device 150, and identity verification of a user using the mobile terminal 100 at the point of time is performed. Examples of an identity verification method include entry of a password, fingerprint authentication, and iris validation, etc. In a case of the successful identity verification, the mobile terminal 100 activates the BAN device 150 through the BAN communication to enable the personal authentication through the BAN communication. This activation becomes invalid in a case where the BAN device 150 is put off from a body. As a result, even if the mobile terminal 100 and the BAN device 150 are stolen together, unless the identity verification is successful, the BAN device 150 is not activated, which makes it possible to prevent the illegal use of the electronic value by a third person more strongly.

Overview of Third Example of Communication Performed by Communication Apparatus 12

FIG. 18 is a diagram illustrating an overview of a third example of communication performed by the communication apparatus 12.

In the case of FIG. 12 and FIG. 17, the mobile terminal 100 is employed as the communication apparatus 12. However, in FIG. 18, the BAN device 150 that enables the data exchange for the settlement with use of the electronic value through the BAN communication, and also serves as a wearable device is employed as the communication apparatus 12.

Further, in the case of FIG. 12 and FIG. 17, the BAN device 150 is employed as a BAN device to be used for the personal authentication through the BAN communication. However, in FIG. 18, the mobile terminal 100 that enables the BAN communication is employed as a BAN device to be used for the personal authentication through the BAN communication.

In FIG. 18, the mobile terminal 100 is registered as a registered device in the BAN device 150 serving as the communication apparatus 12.

Further, in FIG. 18, the data exchange for the settlement with use of the electronic value and the personal authentication of a user are both carried out through the BAN communication, as with the case of FIG. 17.

In other words, in FIG. 18, the BAN device 150 serving as the communication apparatus 12 stores the electronic value in the SE 153 (FIG. 11), and carries out the BAN communication with the communication apparatus 11 to perform the data exchange for settlement with use of, for example, the electronic value stored on the SE 153.

Further, the BAN device 150 serving as the communication apparatus 12 carries out the BAN communication with the mobile terminal 100 (the BAN communication section 120 thereof) serving as a registered device, and performs the personal authentication of a user using the BAN device 150.

The BAN device 150 serving as the communication apparatus 12 is able to carry out the personal authentication of a user through the BAN communication with the mobile terminal 100 as appropriate prior to the data exchange for settlement with use of the electronic value through the BAN communication.

Thereafter, in a case of the successful personal authentication of a user through the BAN communication, the data exchange for the settlement with use of the electronic value through the BAN communication is carried out. On the contrary, in a case of the unsuccessful personal authentication of a user through the BAN communication, the data exchange for the settlement with use of the electronic value through the BAN communication is limited (is not carried out).

For example, in a case where a user registers the mobile terminal 100 in the BAN device 150 as a registered device, and uses the BAN device 150 in a state of carrying the mobile terminal 100, the mobile terminal 100 serving as the registered device is detected through the BAN communication, resulting in the successful personal authentication. In such a case, in the BAN device 150, the data exchange for the settlement with use of the electronic value through the BAN communication is carried out with the communication apparatus 11.

Therefore, if a possessor of the BAN device 150 carries the mobile terminal 100 serving as the registered device, the possessor is able to use the electronic value stored in the BAN device 150 (the SE 153 thereof).

Meanwhile, a third person that obtains the BAN device 150 without permission from a possessor thereof carries no mobile terminal 100 serving as the registered device. Thus, in a case where such a third person uses the BAN device 150, the mobile terminal 100 serving as the registered device is undetectable through the BAN communication, resulting in the unsuccessful personal authentication. In such a case, in the BAN device 150, the data exchange for the settlement with use of the electronic value through the BAN communication is not carried out. As a result, this makes it possible to prevent the illegal use of the electronic value by a third person.

Here, in the present specification, processing that a processor (a computer) executes in accordance with programs is not necessarily performed in a time-series manner in order described as a flowchart. In other words, the processing that a processor executes in accordance with programs includes also processing to be performed in parallel or individually (for example, parallel processing or object-based processing).

Further, in the present specification, a system means a collection of a plurality of component elements (apparatuses and modules (parts), etc.), and it does not matter whether or not all of the component elements are mounted in a same housing. Therefore, a plurality of apparatuses that are accommodated in separate housings and are coupled over a network, and a single apparatus in which a plurality of modules are accommodated in a single housing are both deemed as a system.

It is to be noted that the embodiments of the technology are not limited to the above-described respective embodiments, but various modifications may be made to without departing from the scope of the technology.

For example, in the present embodiments, the mobile terminal 100 or the BAN device 150 is employed as the communication apparatus 12; however, it is also possible to employ an apparatus that is hard to carry, such as a desktop PC (Personal Computer), for example.

In other words, for example, in a case where purchases are made at a shopping site on the Internet using a desktop PC that enables the NFC communication, the technology is applied to a case where an IC card serving as a prepaid card or a credit card is held over the desktop PC to make payment, or the like, which makes it possible to carry out personal authentication of a user before data exchange for settlement to make payment at the shopping site is performed.

Further, in the present embodiments, the description is provided on a case where the technology is applied to the data exchange for settlement with use of the electronic value. However, in addition to the above-described application, the technology is applicable to data exchange for other predetermined processing, such as settlement using information of a credit card, or opening and closing of an electronic lock using information of a key. As the predetermined processing, in addition to the settlement with use of the electronic value, it is possible to adopt, for example, individual processing to be performed for the settlement with use of the electronic value, that is, processing of reading/writing (updating) of data such as the electronic value, etc. stored on the SE 130 in a secure manner.

In addition, in the present embodiments, the personal authentication through the BAN communication is carried out after polling; however, it is possible to perform the personal authentication through the BAN communication irrespective of presence or absence of polling.

Moreover, it is possible to perform the personal authentication through the BAN communication before the data exchange for the predetermined processing is finished completely. For example, in the settlement of electronic money, reading of the balance of electronic money stored on the SE 130, writing to the SE 130 of the updated balance obtained by reducing a given amount of money from the balance, and reading of the updated balance from the SE 130 for confirmation of the updated balance are carried out. In this case, it is possible to perform the personal authentication through the BAN communication prior to reading of the balance of electronic money stored on the SE 130, and in the worst case, such personal authentication may be performed prior to writing of the updated balance into the SE 130.

Here, the effects described herein are merely exemplified and non-limiting, and other effects may also be provided.

Further, the technology may be configured as follows.

<1>
A communication apparatus including:
an authentication section that performs personal authentication of a user through BAN (Body Area Network) communication prior to data exchange with a communication peer for predetermined processing; and
a communication section that performs the data exchange with the communication peer for the predetermined processing in a case of success of the personal authentication.

<2>
The communication apparatus according to <1>, in which the personal authentication is performed in response to a request from the communication peer.

<3>
The communication apparatus according to <1> or <2>, in which the authentication section carries out BAN communication with a BAN device that performs BAN communication to perform the personal authentication.

<4>
The communication apparatus according to <3>, in which the BAN device stores an authentication code to be used for the personal authentication, and
the authentication section performs the personal authentication using the authentication code that is read out from the BAN device through the BAN communication.

<5>
The communication apparatus according to any one of <1> to <4>, in which personal authentication is performed in an alternative method in a case of failure of the personal authentication through the BAN communication.

<6>
The communication apparatus according to any one of <1> to <6>, in which the communication section performs the data exchange with the communication peer for the predetermined processing through NFC (Near Field Communication) communication or BAN communication.

<7>
The communication apparatus according to any one of <1> to <6>, in which the communication section performs data exchange for settlement with use of electronic value having monetary value.

<8>
A communication method including:
performing personal authentication of a user through BAN (Body Area Network) communication prior to data exchange with a communication peer for predetermined processing; and
performing data exchange with the communication peer for the predetermined processing in a case of success of the personal authentication.

<9>

A communication apparatus including:
a communication section that transmits a request of personal authentication of a user prior to data exchange with a communication peer for predetermined processing, and performs data exchange with the communication peer for the predetermined processing in a case of success of the personal authentication through BAN (Body Area Network) communication in the communication peer.

<10>

The communication apparatus according to <9>, in which a request of the personal authentication is transmitted in a case where a prescribed condition is satisfied.

<11>

The communication apparatus according to <9> or <10>, in which a request of the personal authentication is transmitted depending on a class of the communication peer.

<12>

The communication apparatus according to <11>, in which polling is performed, and a request of the personal authentication is transmitted after a response from the communication peer.

<13>

The communication apparatus according to <12>, in which a class of the communication peer is determined on a basis of a response from the communication peer.

<14>

The communication apparatus according to any one of <9> to <13>, in which the communication section performs the data exchange with the communication peer for the predetermined processing through NFC (Near Field Communication) communication or BAN communication.

<15>

The communication apparatus according to any one of <9> to <14>, in which the communication section performs data exchange for settlement with use of electronic value having monetary value.

<16>

A communication method including:
transmitting a request of personal authentication of a user prior to data exchange with a communication peer for predetermined processing; and
performing the data exchange with the communication peer for the predetermined processing in a case of success of the personal authentication through BAN (Body Area Network) communication in the communication peer.

<17>

A communication system including:
a first communication apparatus; and
a second communication apparatus, in which
the first communication apparatus includes: a first communication section that transmits a request of personal authentication of a user prior to data exchange with the second communication apparatus for predetermined processing, and performs the data exchange with the second communication apparatus for the predetermined processing in a case of success of the personal authentication through BAN (Body Area Network) communication in the second communication apparatus, and
the second communication apparatus includes:
an authentication section that performs the personal authentication of the user through the BAN communication in response to the request from the first communication apparatus prior to data exchange with the first communication apparatus for predetermined processing; and
a second communication section that performs the data exchange with the first communication apparatus for the predetermined processing in a case of success of the personal authentication.

This application claims the priority on the basis of Japanese Patent Application No. 2015-166020 filed on Aug. 25, 2015 with Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:

1. A communication apparatus comprising:
a first communication section that is electrically connectable wirelessly to a response apparatus in a manner that permits the first communication section to:
wirelessly receive, from the response apparatus, a request for personal authentication of a user,
wirelessly transmit, to the response apparatus after the first communication section wirelessly receives the request from the response apparatus, an authentication result,
a second communication section that is connectable wirelessly to a BAN (Body Area Network) device in a manner that permits the second communication section to:
wirelessly receive, via the BAN device after the second communication section wirelessly transmits a search command to the BAN device, an authentication code,
wherein the second communication section is configured to wirelessly receive, via Body Area Network communication, the authentication code,
wherein when the authentication code is undetectable by the second communication section, the authentication result indicates a failure of the personal authentication.

2. The communication apparatus according to claim 1, wherein when the authentication result indicates the failure of the personal authentication, the communication apparatus is configured to perform the personal authentication by an alternative method.

3. The communication apparatus according to claim 1, wherein the communication apparatus is configured to perform data exchange for settlement with use of electronic value having monetary value.

4. The communication apparatus according to claim 1, wherein the first communication section is configured to wirelessly receive, via communication other than the Body Area Network communication, the personal authentication request.

5. The communication apparatus according to claim 1, wherein the first communication section is configured to wirelessly receive, via Near Field Communication, the personal authentication request.

6. The communication apparatus according to claim 1, wherein after the first communication section wirelessly receives the personal authentication request from the response apparatus, the second communication section is configured to wirelessly transmit the search command to the BAN device.

7. A communication system comprising:
the communication apparatus according to claim 1; and
the BAN device.

8. A communication method comprising:
connecting a response apparatus wirelessly to a first communication section of a communication apparatus;

connecting a BAN (Body Area Network) device wirelessly to a second communication section of the communication apparatus;

wirelessly receiving, by the first communication section via the response apparatus, a request for personal authentication of a user;

permitting, after the second communication section wirelessly transmits a search command to the BAN device, the second communication section to wirelessly receive an authentication code from the BAN device;

wirelessly transmitting, from the first communication section to the response apparatus after the first communication section wirelessly receives the request from the response apparatus, an authentication result, wherein the second communication section is configured to wirelessly receive, via Body Area Network communication, the authentication code, wherein when the authentication code is undetectable by the second communication section, the authentication result indicates a failure of the personal authentication.

9. The communication method according to claim 8, further comprising:

performing, by the communication apparatus when the authentication result indicates the failure of the personal authentication, the personal authentication by an alternative method.

10. The communication method according to claim 8, further comprising:

performing, by the communication apparatus, data exchange for settlement with use of electronic value having monetary value.

11. The communication method according to claim 8, wherein the first communication section is configured to wirelessly receive, via communication other than the Body Area Network communication, the personal authentication request.

12. The communication method according to claim 8, wherein the first communication section is configured to wirelessly receive, via Near Field Communication, the personal authentication request.

13. The communication method according to claim 8, further comprising:

wirelessly, after the first communication section wirelessly receives the personal authentication request from the response apparatus, transmitting the search command from the second communication section to the BAN device.

* * * * *